United States Patent
Wu

(10) Patent No.: US 10,680,986 B1
(45) Date of Patent: Jun. 9, 2020

(54) STACKED CHAT CONVERSATIONS

(71) Applicant: Snap Inc., Santa Monica, CA (US)

(72) Inventor: William Wu, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 105 days.

(21) Appl. No.: 15/833,761

(22) Filed: Dec. 6, 2017

Related U.S. Application Data

(60) Provisional application No. 62/432,629, filed on Dec. 11, 2016.

(51) Int. Cl.
| | | |
|---|---|---|
| *H04L 12/58* | (2006.01) | |
| *G06F 3/0488* | (2013.01) | |
| *H04L 29/08* | (2006.01) | |
| *G06F 3/0482* | (2013.01) | |
| *H04M 1/725* | (2006.01) | |

(52) U.S. Cl.
CPC .......... *H04L 51/16* (2013.01); *G06F 3/04883* (2013.01); *H04L 51/043* (2013.01); *H04L 67/36* (2013.01); *G06F 3/0482* (2013.01); *H04M 1/72552* (2013.01); *H04M 1/72586* (2013.01)

(58) Field of Classification Search
CPC ....... H04L 51/16; H04L 51/04; H04L 51/046; H04L 51/32; H04L 51/043; H04L 67/36; H04M 1/72552; H04M 1/72547; H04M 1/72586; G06Q 10/107; G06F 3/0482; G06F 3/0488; G06F 3/04883
See application file for complete search history.

(56) References Cited

U.S. PATENT DOCUMENTS

| | | | |
|---|---|---|---|
| 6,038,295 | A  | 3/2000  | Mattes |
| 6,980,909 | B2 | 12/2005 | Root et al. |
| 7,173,651 | B1 | 2/2007  | Knowles |
| 7,411,493 | B2 | 8/2008  | Smith |

(Continued)

FOREIGN PATENT DOCUMENTS

CA      2887596      7/2015

OTHER PUBLICATIONS

Leyden, John, "This SMS will self-destruct in 40 seconds", [Online]. Retrieved from the Internet: URL: http: www.theregister.co.uk 2005 12 12 stealthtext , (Dec. 12, 2005), 1 pg.

*Primary Examiner* — Andrew L Tank
(74) *Attorney, Agent, or Firm* — Schwegman Lundberg & Woessner, P.A.

(57) ABSTRACT

Disclosed is a method for automatic arrangement of communications for improved functionality. A client device presents a stacked set of conversation cells on a display of the client device. The stacked set of conversation cells is stacked such that a first conversation cell corresponding to a first chat conversation from the stacked set of conversation cells is a top conversation cell of the stacked set of conversation cells. While presenting the stacked set of conversation cells, the client device receives a first chat communication that is a part of a second chat conversation that is different than the first chat conversation. In response to the receiving of the first chat communication, the client device modifies the presentation of the stacked set of conversation cells such that a second conversation cell corresponding to the second chat conversation is presented as the top conversation cell of the stacked set of conversation cells.

20 Claims, 25 Drawing Sheets

(56) References Cited

U.S. PATENT DOCUMENTS

| | | | |
|---|---|---|---|
| 7,535,890 B2 | 5/2009 | Rojas | |
| 7,877,708 B2 * | 1/2011 | Zinn | G06F 3/0482 715/864 |
| 8,131,597 B2 | 3/2012 | Hudetz | |
| 8,199,747 B2 | 6/2012 | Rojas et al. | |
| 8,332,475 B2 | 12/2012 | Rosen et al. | |
| 8,407,603 B2 * | 3/2013 | Christie | G06F 3/04883 715/751 |
| 8,718,333 B2 | 5/2014 | Wolf et al. | |
| 8,724,622 B2 | 5/2014 | Rojas | |
| 8,874,677 B2 | 10/2014 | Rosen et al. | |
| 8,909,679 B2 | 12/2014 | Roote et al. | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,100,806 B2 | 8/2015 | Rosen et al. | |
| 9,100,807 B2 | 8/2015 | Rosen et al. | |
| 9,191,776 B2 | 11/2015 | Root et al. | |
| 9,204,252 B2 | 12/2015 | Root | |
| 9,443,227 B2 | 9/2016 | Evans et al. | |
| 9,489,661 B2 | 11/2016 | Evans et al. | |
| 9,491,134 B2 | 11/2016 | Rosen et al. | |
| 9,665,850 B2 * | 5/2017 | McCann | G06Q 10/107 |
| 9,971,500 B2 * | 5/2018 | Yang | G06F 3/0482 |
| 2004/0015548 A1 * | 1/2004 | Lee | H04L 12/1827 709/204 |
| 2009/0061825 A1 * | 3/2009 | Neelakantan | H04L 29/12292 455/412.1 |
| 2009/0138828 A1 * | 5/2009 | Schultz | G06Q 10/10 715/853 |
| 2010/0058203 A1 * | 3/2010 | Moudy | G06F 16/00 715/759 |
| 2010/0217808 A1 * | 8/2010 | Benninger | H04L 51/04 709/206 |
| 2010/0332518 A1 * | 12/2010 | Song | G06F 3/0483 707/769 |
| 2011/0202598 A1 | 8/2011 | Evans et al. | |
| 2011/0258559 A1 * | 10/2011 | You | G06Q 10/107 715/752 |
| 2012/0124147 A1 * | 5/2012 | Hamlin | H04L 51/36 709/206 |
| 2012/0185797 A1 * | 7/2012 | Thorsen | G06Q 10/00 715/784 |
| 2012/0209924 A1 | 8/2012 | Evans et al. | |
| 2013/0072262 A1 * | 3/2013 | Mhun | H04M 1/72552 455/566 |
| 2013/0179800 A1 * | 7/2013 | Jeong | G06F 3/04817 715/752 |
| 2013/0227030 A1 * | 8/2013 | Eidelson | H04L 67/1095 709/206 |
| 2014/0068468 A1 * | 3/2014 | Yoon | H04L 65/403 715/758 |
| 2014/0089440 A1 * | 3/2014 | Buchheit | G06Q 10/107 709/206 |
| 2015/0040029 A1 * | 2/2015 | Koum | H04L 51/10 715/748 |
| 2015/0095801 A1 * | 4/2015 | Kim | H04L 51/04 715/752 |
| 2015/0106741 A1 * | 4/2015 | Friend | H04L 51/16 715/752 |
| 2016/0246460 A1 * | 8/2016 | Cao | H04L 51/04 |
| 2016/0259413 A1 * | 9/2016 | Anzures | G06F 3/0482 |
| 2018/0145937 A1 * | 5/2018 | Choi | H04L 51/046 |
| 2018/0270183 A1 * | 9/2018 | Wei | H04L 51/046 |

* cited by examiner

600

DETERMINE THAT A USER HAS ADDED AT LEAST TWO RECIPIENTS TO RECEIVE A MESSAGE
602

CAUSE A DISPLAY OF A GROUP CHAT CREATION BUTTON
604

RECEIVE A USER INPUT INDICATING THAT THE USER HAS SELECTED THE GROUP CHAT CREATION BUTTON
606

GENERATE A GROUP CHAT CONVERSATION THAT INCLUDES THE SELECTED RECIPIENTS AS MEMBERS
608

TRANSMIT THE MESSAGE AS A CHAT MESSAGE IN THE GROUP CHAT CONVERSATION
610

```
┌─────────────────────────────────────────────────────────────┐
│ PRESENT A STACKED SET OF CONVERSATION CELLS ON A DISPLAY    │
│ OF THE CLIENT DEVICE                                        │
│ 702                                                         │
└─────────────────────────────────────────────────────────────┘
                              │
                              ▼
┌─────────────────────────────────────────────────────────────┐
│ RECEIVE A FIRST CHAT COMMUNICATION THAT IS A PART OF A      │
│ SECOND CHAT CONVERSATION                                    │
│ 704                                                         │
└─────────────────────────────────────────────────────────────┘
                              │
                              ▼
┌─────────────────────────────────────────────────────────────┐
│ MODIFY PRESENTATION OF THE STACKED SET OF CONVERSATION CELLS│
│ 706                                                         │
└─────────────────────────────────────────────────────────────┘
```

*FIG. 7*

STACKED CHAT CONVERSATIONS

CROSS-REFERENCE TO RELATED APPLICATIONS

The present application claims the benefit of priority of U.S. Provisional Application No. 62/432,629, filed on Dec. 11, 2016, which is incorporated herein by reference in its entirety.

TECHNICAL FIELD

Embodiments pertain to digital messaging between multiple devices, along with the communication of associated data and automatic arrangement of communications for improved functionality.

BACKGROUND

Online chat messaging refers to communications via a network with real-time transmission of text messages between users. These messages are generally short to enable participants to respond quickly, thereby creating the feeling of a conversation. Such communications are often between two users, and structured as point-to-point communications, but can also be multicast or structured as group communications. In many chat messaging systems, managing multiple chat conversations can be cumbersome. For example, to review a chat message received while the user is drafting another draft message often requires the user to either abandon the message they are drafting or complete the message prior to reviewing the newly received message. Accordingly, improvements are needed.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 6 is a flowchart showing an example method of creating a group chat conversation, according to certain example embodiments.

FIG. 7 is a flowchart showing an example method of automatically rearranging a stacked set of conversation cells, according to certain example embodiments.

DETAILED DESCRIPTION

Figure 1:
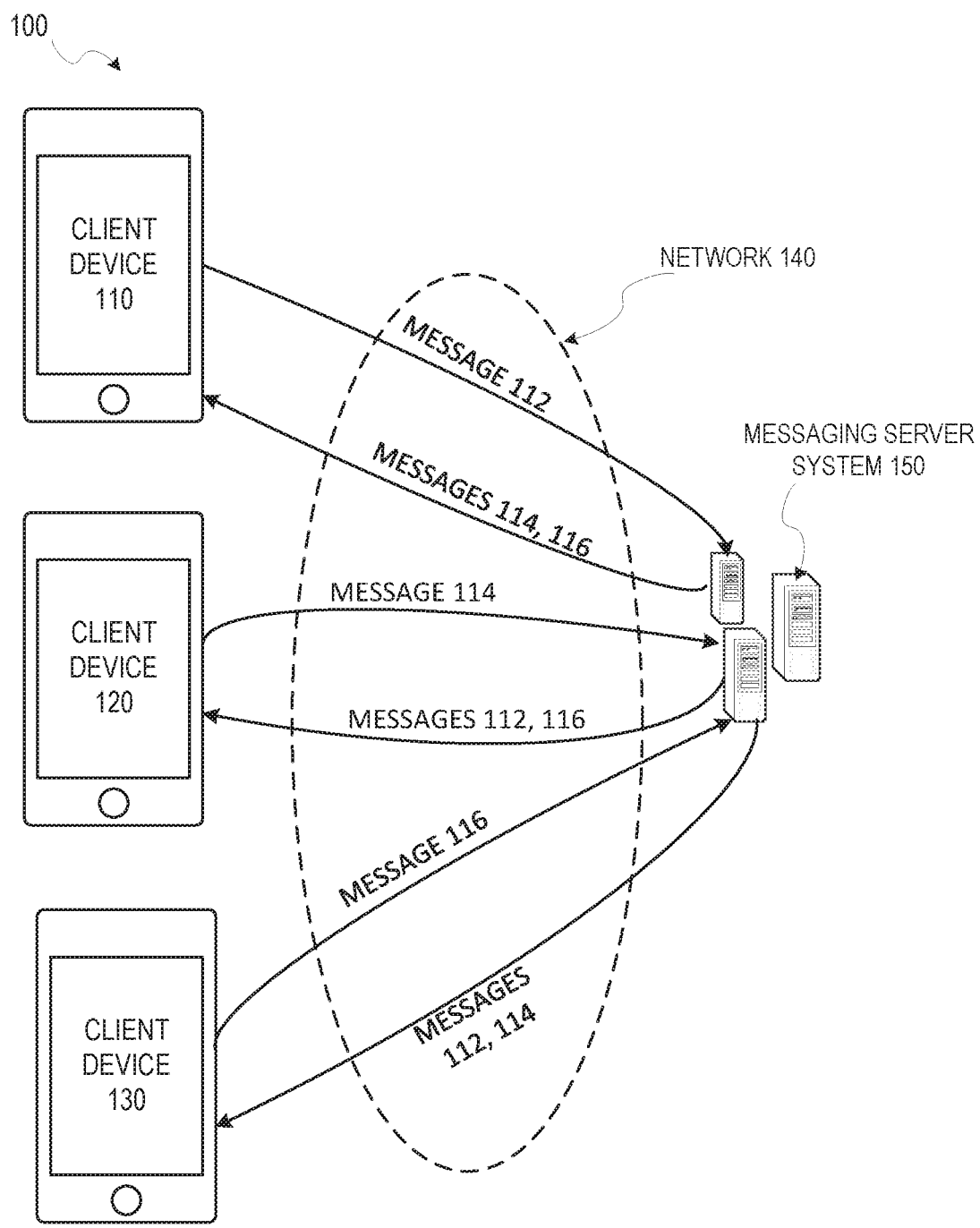
FIG. 1 shows a networked system that facilitates a chat conversations amongst multiple client devices, according to some example embodiments.

Embodiments described herein pertain to message-based communications between multiple devices, presenting conversation cells corresponding to chat conversations, arrangement of multiple conversation cells in a stacked set of conversation cells, and creation of group chat conversations. Some embodiments may operate in the context of a social networking environment where client devices may not only send and receive text messages as part of a chat communication, but may also send multi-media messages (e.g., ephemeral photographs and video clips) to groups of friends. In this context, a friend is a user account associated with one or more devices that has been associated with another account, either by a friend request and response, or some other such association method.

Example embodiments allow users to create a chat conversation. For example, a user can create an individual chat conversation including two participants, or a group chat conversation including three or more participants. In some embodiments, the user can create a group chat conversation with up to a threshold number of friends in a single group chat conversation. Users can create chat conversations from an overall feed user interface (UI), such as a list of current users and/or groups that have initiated messages to a user's devices or a "send to" UI (e.g., a UI for initiating a message or content communication to one or more other users.) Additionally, "presence" and "receipt" information allows users to know when their friends are present in the chat conversation and interacting with user messages via an interface presented on a user's device.

In some embodiments, a user who adds multiple recipients to a message can be presented with an actionable (or selectable) group creation button to allow the user to generate a group chat conversation. For example, a user may wish to send an ephemeral message, including a photograph, to multiple friends. In response to detecting that the user has selected at least two recipients to receive the message, the user can be presented with the group creation button. The user can then select the group creation button to transmit the message as part of a group conversation to each recipient or, alternatively, transmit the message individually to each recipient.

A user may engage in more than one chat conversation. For example, the user may be engaged in two or more group and/or individual chat conversations. An overview interface can present unique conversation cells for each of the active chat conversations in which the user is engaged. The user can use the conversation cells to select one of the active chat conversations and to participate in the selected chat conversations.

In some embodiments, the conversation cells are arranged in a stacked set of conversation cells that allow a user to navigate amongst the various chat conversations. The stacked set of conversation cells can be automatically rearranged for the user to present the user with the chat conversation that is most pertinent to the user at a given time. For example, the stacked set of conversation cells can be automatically rearranged when a new message is received by the user's client device such that the conversation cell associated with the received message is presented at the top of the stacked set of conversation cells. The user can then easily view and respond to the received message.

FIG. 1 shows a networked system 100 that facilitates a chat conversation amongst multiple client devices, according to some example embodiments. A chat conversation refers to either an individual chat conversation including two participants, or a group chat conversation including three or more participants. Although the networked system 100 is shown as facilitating a group chat conversations, one skilled in the art would readily recognize that the system 100 may also be used to provide an individual chat conversation that includes only two participants that are communicating by sending messages back and forth.

As shown, the system 100 includes three client devices 110, 120, and 130 as well as a messaging server system 150 and a network 140. The network 140 is used to convey communications between the client devices 110, 120, and 130 and the messaging server system 150. The client devices 110, 120, and 130 may be any smartphone, tablet, phablet, laptop computer, network-enabled camera, or any other such network enabled device. The client devices 110, 120, and 130 may include a keyboard or touchscreen for entering text information, as well as a camera device for capturing additional content that may be part of a supplemental (e.g., non-text) communication between users or members of a group.

The client devices 110, 120, and 130 are connected to the messaging server system 150 via the network 140. The network 140 may include any combination of wired and wireless connections. The network 140 may include cellular access networks, access point interfaces to the Internet, or any other such networks 140 or network elements. For example, client device 110 may interface with the network 140 using a Long Term Evolution (LTE) cellular network to communicate with the messaging server system 150, while the client device 120 may use a Wi-Fi access point to interface with the network 140 and communicate with the messaging server system 150.

The messaging server system 150 may be one or more computing devices included as part of a service or network computing system. In certain embodiments, particularly embodiments with large numbers of client devices 110, 120, and 130 interfacing with the messaging server system 150 from widely different locations all over the globe, the messaging server system 150 is a distributed network 140 of server computers that are similarly widely distributed, and which communicate with each other via the network 140. In some embodiments, the client devices 110, 120, and 130, as well as any elements of the messaging server system 150 and the network 140, may be implemented using elements of software architecture 1306 or machine 1400 described in FIGS. 13 and 14.

The messaging server system 150 facilitates chat conversations in which messages are communicated between the client devices 110, 120, and 130. In the embodiment discussed below, the client devices 110, 120, and 130 (or messaging client applications executing on these client devices) are each associated with a different user account, and each of these user accounts for the client devices 110, 120, and 130 have joined a single group chat conversation. Accordingly, the client devices 110, 120, and 130 send messages to the other client devices 110, 120, and 130 in the group chat conversation via the network 140 and the messaging server system 150. The client devices 110, 120, and 130 receive messages transmitted as part of the group chat conversation via the same manner.

As shown in FIG. 1, the client device 110 communicates a content message 112 to the messaging server system 150 as part of a group chat conversation, and the messaging server system transmits the content message 112 to client device 120 and 130. Likewise, client device 120 transmits a content message 114 to the messaging server system 150 as part of the group chat conversation, and the messaging server system transmits the content message 114 to client device 110 and 130. Similarly, client device 130 transmits a content message 116 to the messaging server system 150 as part of the group chat conversation, and the messaging server system transmits the content message 116 to client device 110 and 120. All three of the client devices 110, 120, and 130 are associated with a single group chat conversation, and the messages 112, 114, and 116 are sent as part of the group chat conversation to the messaging server system 150, which then directs each message 112, 114, and 116 so that every member of the group chat conversation receives a copy of each message.

Each client device 110, 120, and 130 includes a feed interface that may be part of a messaging client application executing on the respective client device. When chat messages are received, a notifier appears in the feed interface, and a group chat conversation, individual chat conversation, or other message may be accessed. A selection within the feed may navigate a user to a chat view.

Figure 2:
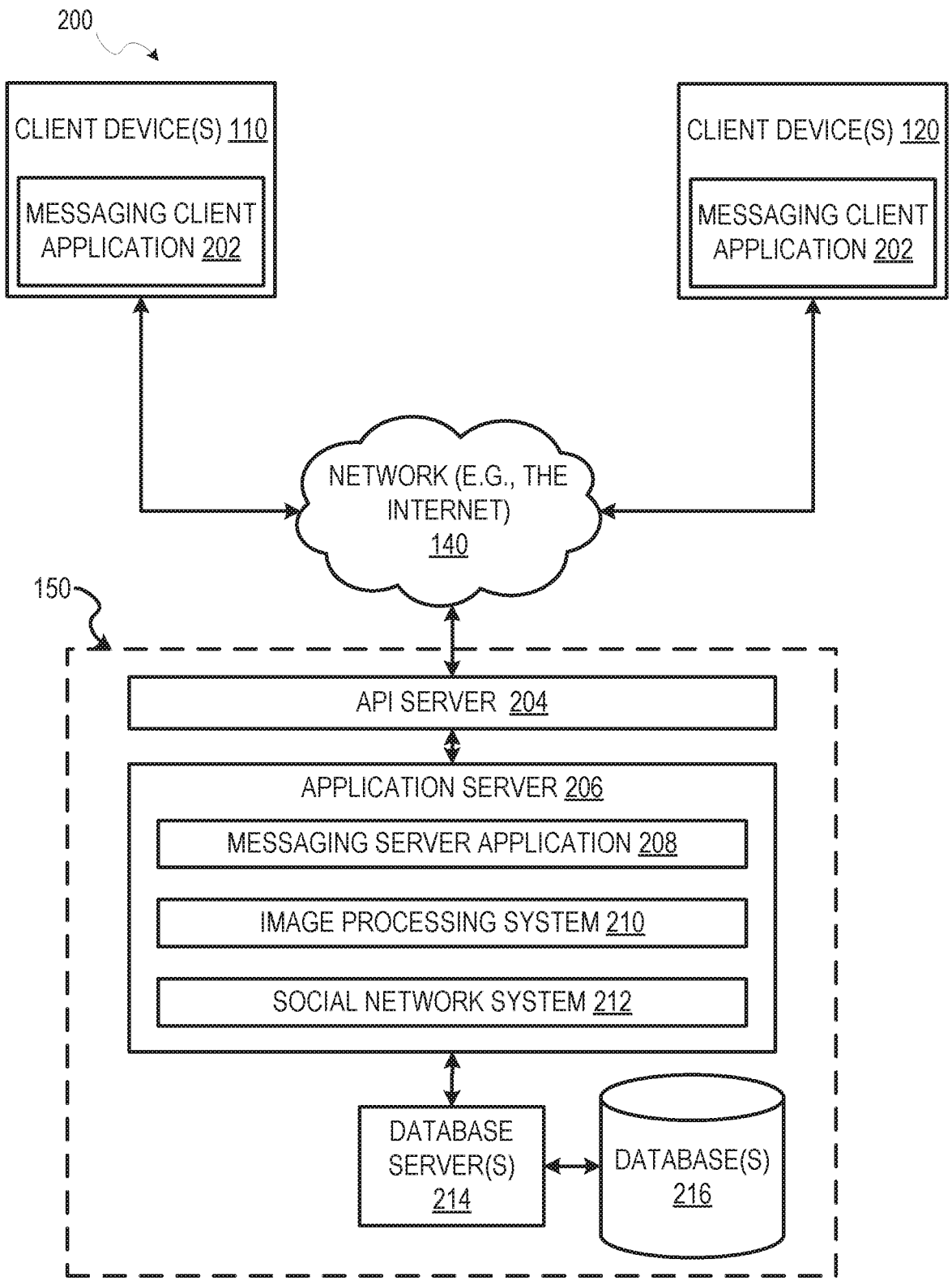
FIG. 2 is a block diagram of a messaging system for facilitating a chat conversation, according to some example embodiments.

FIG. 2 is a block diagram of a messaging system 200 for facilitating a chat conversation, according to some example embodiments. The messaging system 200 includes multiple client devices 110 and 120, each of which hosts a number of applications including a messaging client application 202. While only two client devices are shown, this is not meant to be limiting. The messaging system may include any number of client devices. Each messaging client application 202 is communicatively coupled to other instances of the messaging client application 202 and the messaging server system 150 via the network 140 (e.g., the Internet).

Accordingly, each messaging client application 202 is able to communicate and exchange data with another messaging client application 202 and with the messaging server system 150 via the network 140. The data exchanged between messaging client applications 202, and between a messaging client application 202 and the messaging server system 150, includes functions (e.g., commands to invoke functions) as well as payload data (e.g., text, audio, video or other multimedia data).

The messaging server system 150 provides server-side functionality via the network 140 to a particular messaging client application 202. While certain functions of the messaging system 200 are described herein as being performed by either a messaging client application 202 or by the messaging server system 150, it will be appreciated that the location of certain functionality either within the messaging client application 202 or the messaging server system 150 is a design choice. For example, it may be technically preferable to initially deploy certain technology and functionality within the messaging server system 150, but to later migrate this technology and functionality to the messaging client application 202 where a client device 110 has a sufficient processing capacity.

The messaging server system 150 supports various services and operations that are provided to the messaging client application 202. Such operations include transmitting data to, receiving data from, and processing data generated by the messaging client application 202. This data may include message content, client device information, geolocation information, media annotation and overlays, message content persistence conditions, social network information, and live event information, as examples. Data exchanges within the messaging system 200 are invoked and controlled through functions available via UIs of the messaging client application 202.

Turning now specifically to the messaging server system 150, an Application Program Interface (API) server 204 is coupled to, and provides a programmatic interface to, an application server 206. The application server 206 is communicatively coupled to a database server 214, which facilitates access to a database 216 in which is stored data associated with messages processed by the application server 206.

Dealing specifically with the API server 204, this server receives and transmits message data (e.g., commands and message payloads) between the client devices 110, 120 and the application server 206. Specifically, the API server 204 provides a set of interfaces (e.g., routines and protocols) that can be called or queried by the messaging client application 202 in order to invoke functionality of the application server 206. The API server 204 exposes various functions supported by the application server 206, including account registration, login functionality, the sending of messages, via the application server 206, from a particular messaging client application 202 to another messaging client application 202, the sending of media files (e.g., images or video) from a messaging client application 202 to a messaging server application 208; and, for possible access by another messaging client application 202, the setting of a collection of media data, the retrieval of a list of friends of a user of a client device 110, 120, the retrieval of such collections, the retrieval of messages and content, the adding and deletion of friends to a social graph, the location of friends within a social graph, and opening an application event (e.g., relating to the messaging client application 202).

The application server 206 hosts a number of applications and subsystems, including a messaging server application 208, an image processing system 210, and a social network system 212. The messaging server application 208 implements a number of message processing technologies and functions, which are implemented by both the messaging server system 150 and the messaging client application 202. For example, the messaging server application 208 implements functionality related to the aggregation and other processing of content (e.g., textual and multimedia content) included in messages received from multiple instances of the messaging client application 202. For example, the messaging server application 208 may aggregate text and media content from multiple sources into collections of content, which are then made available, by the messaging server application 208, to the messaging client application 202. Other processor and memory intensive processing of data may also be performed server-side by the messaging server application 208, in view of the hardware requirements for such processing.

Further, the messaging server application 208 may facilitate chat conversations between multiple client devices 110. As will be described in greater detail below, the messaging server application 208 enables users to create a new chat conversation (e.g., individual group conversation or group chat conversation), view and select from existing chat conversations, as well as send and receive messages as part of a chat conversation. The messaging server application 208 also organizes chat conversations for a user in a manner that allows the user to easily select from the chat conversations. A user may engage in more than one chat conversation. For example, the user may be engaged in two or more group chat conversations and/or individual chat conversations. The messaging server application 208 presents unique conversations cells for each of the active chat conversations in which the user is engaged. The user can use the conversation cells to select one of the active chat conversations and to participate in the selected chat conversations.

The messaging server application 208 arranges the conversation cells in a stacked set of conversation cells that allows a user to navigate amongst the various chat conversations. The messaging server application 208 automatically rearranges the stacked set of conversation cells for the user to present the user with the chat conversation that is most pertinent to the user at a given time. For example, messaging server application 208 automatically rearranges the stacked set of conversation cells when a new message is received by the user's client device 110 such that the conversation cell associated with the received message is presented at the top of the stacked set of conversation cells. The user can then easily view and respond to the received message.

The application server 206 also includes an image processing system 210 that is dedicated to performing various image processing operations, typically with respect to images or video received within the payload of a message at the messaging server application 208.

The social network system 212 supports various social networking functions and services, and makes these functions and services available to the messaging server application 208. To this end, the social network system 212 maintains and accesses an entity graph within the database 216. Examples of functions and services supported by the social network system 212 include the identification of other users of the messaging system 200 with which a particular user has relationships or is "following," and also the identification of other entities and interests of a particular user.

Figure 3:
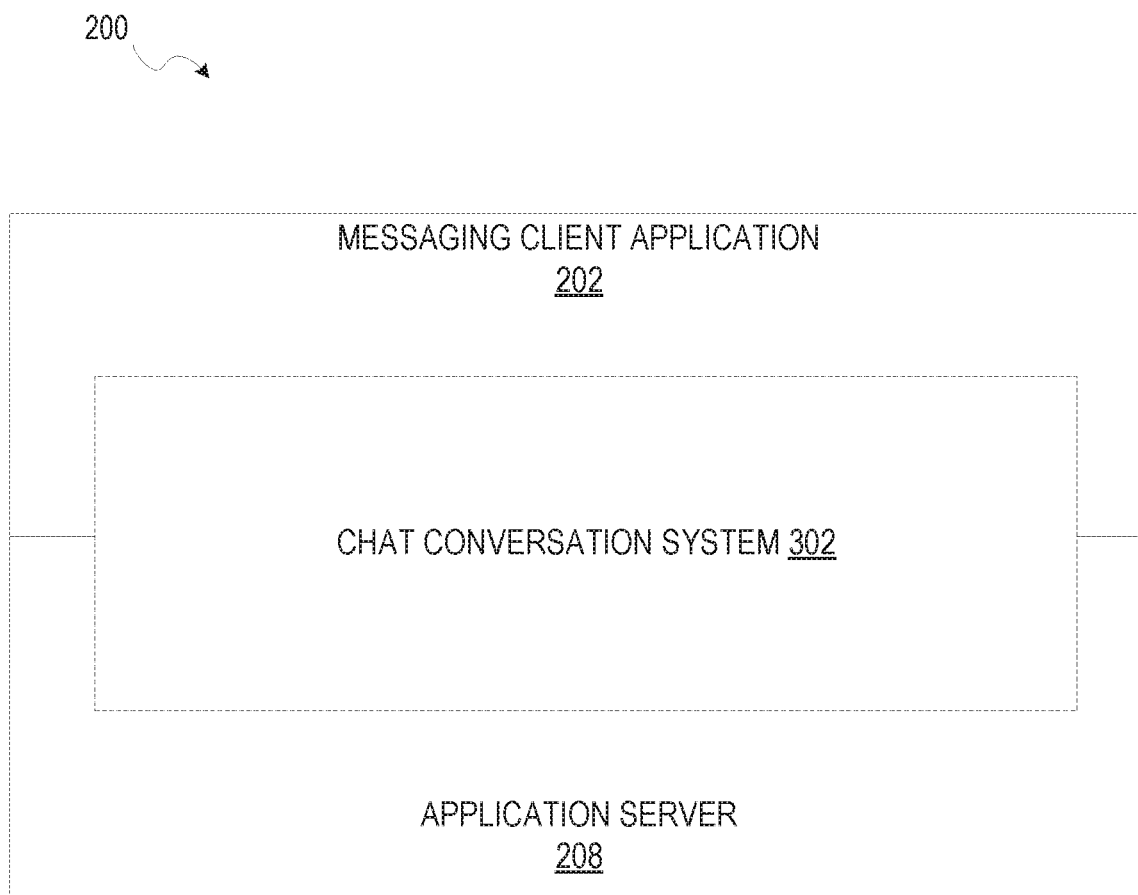
FIG. 3 is block diagram illustrating further details regarding the messaging system, according to some example embodiments.

FIG. 3 is block diagram illustrating further details regarding the messaging system 200, according to some example embodiments. Specifically, the messaging system 200 is shown to comprise the messaging client application 202 and the application server 208, which in turn embody a chat conversation system 302. The chat conversation system 302 facilitates chat conversation functionality for users of the messaging system 200. While the messaging system 200 is shown as only including the chat conversation system 302, this is not meant to be limiting. To avoid obscuring the inventive subject matter with unnecessary detail, various functional components (e.g., modules), systems, and the like that are not germane to conveying an understanding of the inventive subject matter have been omitted from FIG. 3. However, a skilled artisan will readily recognize that various additional functional components may be supported by the messaging system 200 to facilitate additional functionality that is not specifically described herein. Furthermore, the various functional modules of the messaging system 200 may reside on a single computing device or may be distributed across several computing devices in various arrangements such as those used in cloud-based architectures.

Figure 4:
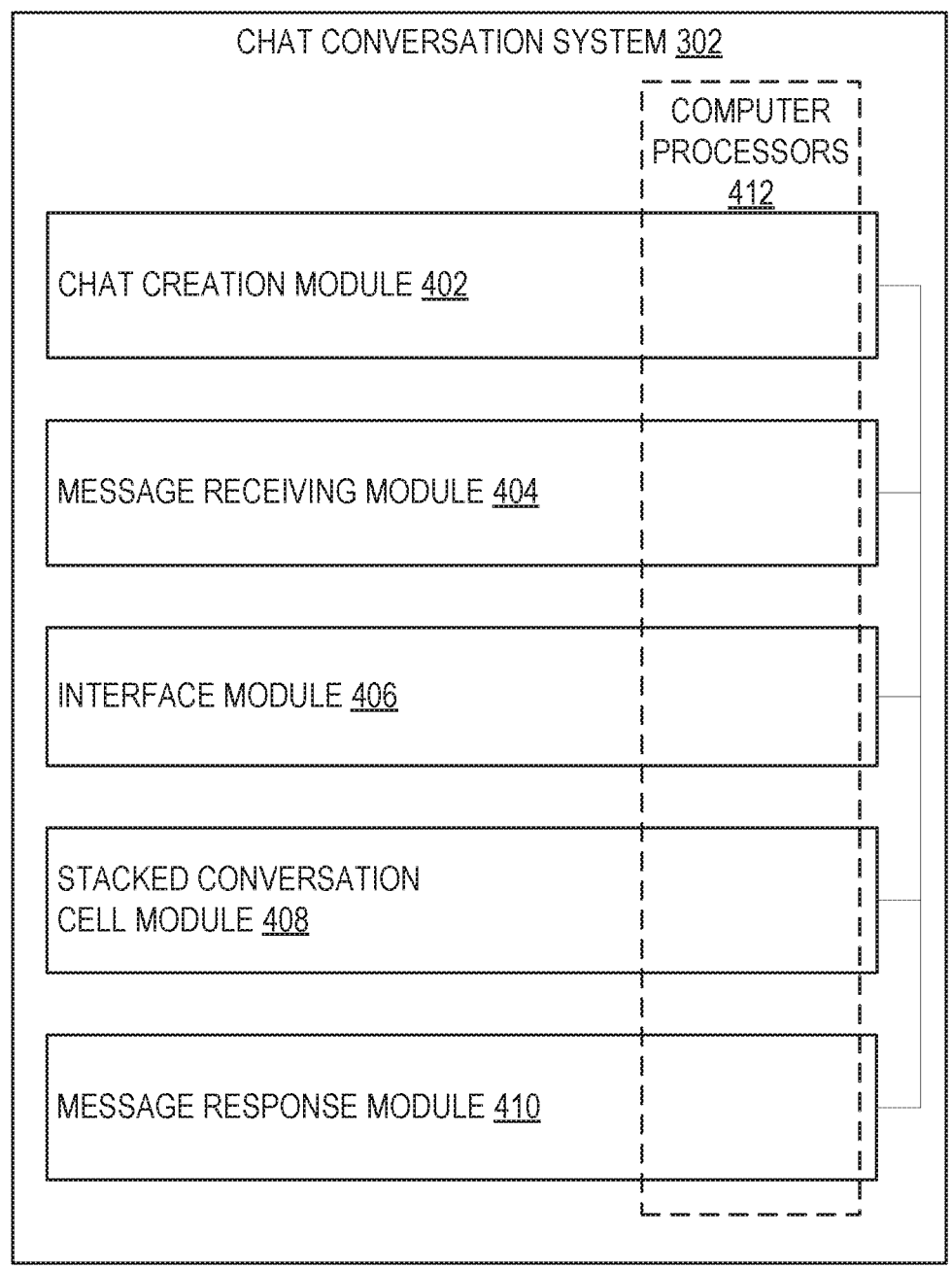
FIG. 4 shows a block diagram illustrating various modules of the chat conversation system 302, according to certain example embodiments.

FIG. 4 shows a block diagram illustrating various modules of the chat conversation system 302, according to certain example embodiments. The chat conversation system 302 is shown as including a chat creation module 402, a message receiving module 404, an interface module 406, a stacked conversation cell module 408, and a message response module 410. The various modules of the chat conversation system 302 are configured to communicate with each other (e.g., via a bus, shared memory, or a switch). Any one or more of these modules may be implemented using one or more computer processors 412 (e.g., by configuring such one or more computer processors to perform functions described for that module) and hence may include one or more of the computer processors 412.

Any one or more of the modules described may be implemented using hardware alone (e.g., one or more of the computer processors 412 of a machine (e.g., machine 1400)) or a combination of hardware and software. For example, any described module of the chat conversation system 302 may physically include an arrangement of one or more of the computer processors 412 (e.g., a subset of or among the one or more computer processors of the machine (e.g., machine 1400)) configured to perform the operations described herein for that module. As another example, any module of the chat conversation system 302 may include software, hardware, or both, that configure an arrangement of one or more computer processors 412 (e.g., among the one or more computer processors of the machine (e.g., machine 1400)) to perform the operations described herein for that module. Accordingly, different modules of the chat conversation system 302 may include and configure different arrangements of such computer processors 412 or a single arrangement of such computer processors 412 at different points in time. Moreover, any two or more modules of the chat conversation system 302 may be combined into a single module, and the functions described herein for a single module may be subdivided among multiple modules. Furthermore, according to various example embodiments, modules described herein as being implemented within a single machine, database, or device may be distributed across multiple machines, databases, or devices.

The chat creation module 402 provides a chat creation interface that a user can use to create a chat conversation. For example, the chat creation interface provides the user with a listing of contacts that a user can select from to add users to a chat conversation. In response to a user using the listing of contacts to select multiple users, the chat creation module 402 presents the user with an actionable (or selectable) group creation button to allow the user to generate a group chat conversation. For example, a user may wish to send an ephemeral message, including a photograph, to multiple friends. In response to detecting that the user has selected at least two recipients to receive the message, the chat creation module 403 presents the user with the group creation button. The user can then select the group creation button to transmit the message as part of a group conversation to each recipient or, alternatively, transmit the message individually to each recipient.

The message receiving module 404 receives chat messages from client devices. The chat messages can be received as part of chat conversations (either group chat conversations or individual chat conversations). The received chat messages can include data identifying a specified chat conversation with which the message is associated. For example, the chat messages can include metadata stored in the message header indicating the chat conversations associated with the received message.

Interface module 406 presents a user interface that allows the user to view, create, and participate in chat conversations. For example, the interface module 406 provides the user with user interface elements, such as buttons, text boxes, etc., that allow the user to select to view a chat conversation, draft and submit a chat message, etc. The interface module 406 receives user inputs using one or more input devices of a client device 110, such as a touch screen, physical buttons, mouse, microphone, etc.

The interface module 406 presents a conversation cell corresponding to a chat conversation. A conversation cell is a user interface or window designated to a chat conversation. For example, the conversation cell includes a record of chat messages and other chat conversation metadata that a user can view in the conversation cell. Additionally, a conversation cell allows the user to draft and submit chat messages to the corresponding chat conversation. Accordingly, a user can select a conversation cell to participate in the corresponding chat conversation.

Stacked conversation cell module 408 manages the presentation of multiple conversation cells in a stacked set of conversation cells. A stacked set of conversation cells includes one or more conversation cells stacked on top of each other to allow a user to easily navigate amongst the conversation cells. The stacked set of conversation cells includes one conversation cell that is designated as a top conversation cell, meaning that the conversation cell is presented above all of the other conversation cells in the stacked set of conversation cells. In some embodiments, the user may only interact with a conversation cell (e.g., browse chat message history, draft new chat messages, etc.) when the conversation cell is designated as the top conversation cell. In this type of embodiments, a user can cause the desired conversation cell to be promoted to the top conversation cell by, for example, selecting the conversation cell, swiping away conversations cells positioned above the desired conversation cell, etc.

Stacked conversation cell module 408 automatically rearranges the order of the stacked set of conversation cells to present the user with the conversation cell that is most pertinent to the user at a given time. For example, the stacked set of conversation cells is automatically rearranged when a new message is received by the user's client device such that the conversation cell associated with the received message is presented at the top of the stacked set of conversation cells. The user can then easily view and respond to the received message.

In some embodiments, the stacked set of conversation cells is associated with a threshold number of conversation cells that can be included in the stacked set of conversation cells. To add a new conversation cell to the stacked set when the threshold is met, the stacked conversation cell module 408 causes one of the included conversation cells to be removed from the stack to make room for the new conversation cell. For example, the stacked conversation cell module 408 removes a conversation cell that has been inactive (e.g., has not sent or received chat messages).

The message response module 410 transmits messages as part of a chat conversation. For example, in response to a user drafting and submitting a chat message, the message response module 410 transmits the chat message to an appropriate server system (e.g., messaging server system 150) to be delivered to the other participants of the chat conversation.

Figure 5:
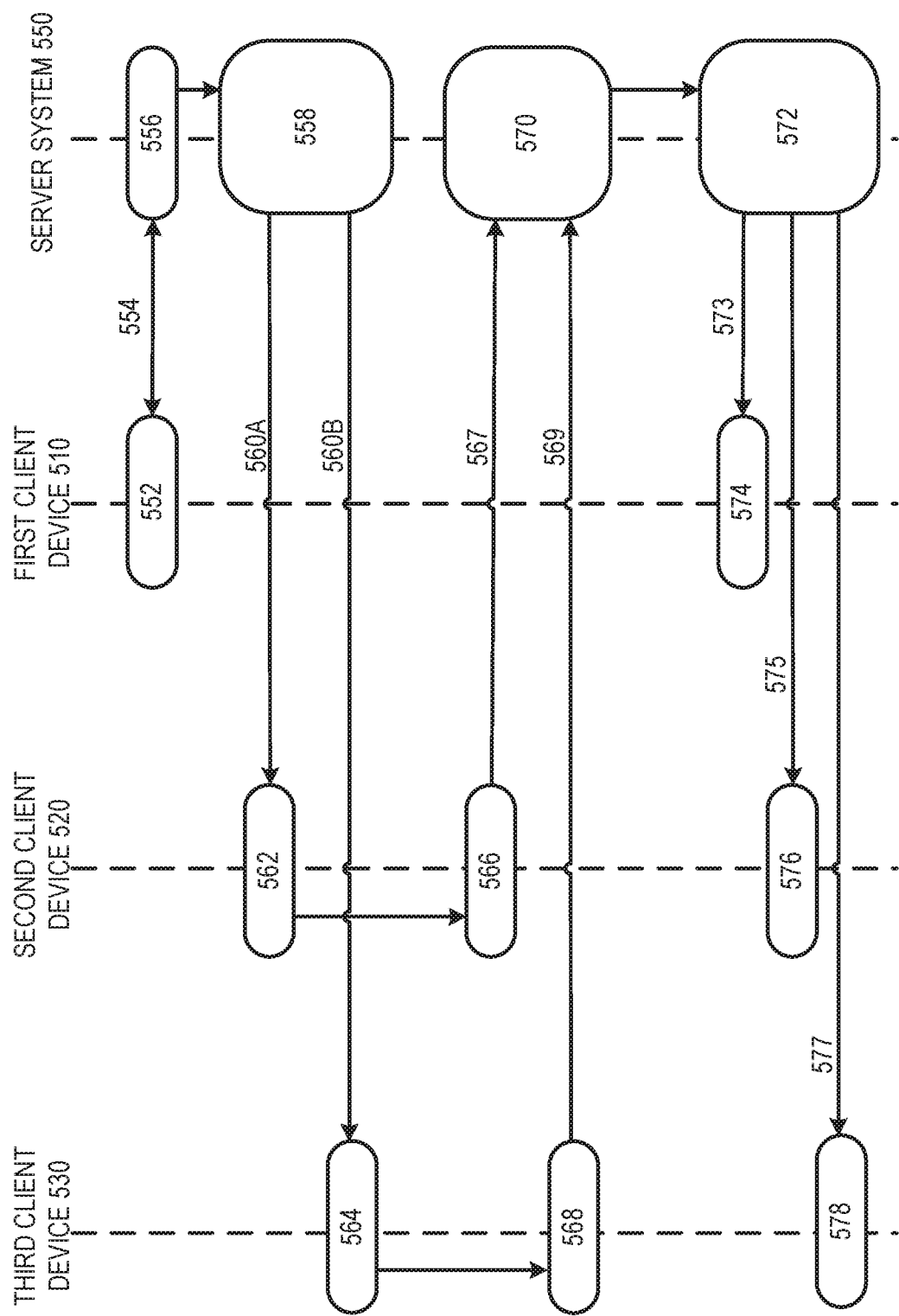
FIG. 5 illustrates example communications between a server computer and client devices associated with user accounts that are part of a chat conversation.

FIG. 5 illustrates example communications between a server computer and client devices associated with user accounts that are part of a chat conversation. FIG. 5 shows client devices 510, 520, and 530 communicating with each other via server system 550, and interacting with server system 550 to implement chat conversations.

In the embodiment of FIG. 5, communications 554 between client device 510 and server system 550 enable generation of an association between user accounts. For example, the association can be between two user accounts (e.g., an individual chat conversation) or three or more user accounts (e.g., a group chat conversation). First client device 510 may receive user inputs selecting the user accounts, or identifiers associated with the user accounts, in operation 552 and may communicate this list to server system 550.

The user input can be the result of the user of the first client device 510 using a group creation button to create the group chat conversation. The first client device 510 can present the user with the group creation button in response to detecting that the user has selected two or more recipients for a message. The user can select the group creation button to cause a group chat conversation to be created that includes the individual user accounts as participants. Accordingly, the user's message will be transmitted to the selected recipients as part of the group chat conversation. Alternatively, the user can select to transmit the messages as individual chat conversations to the selected recipients.

Server system 550 processes the selection from first client device 510 and generates the association as a chat conversation. In some embodiments, communications 554 include a first chat message that is received at server system 550 before the association between accounts is stored at server system 550 in operation 556.

After the association between accounts occurs to create a group chat conversation, and a first message is received at server system 550, then in operation 558, the server system manages communication of the first chat message to client device 520 and client device 530 in chat communications 560A and 560B, which include copies of the first chat message. Second client device 520 and third client device 530 are identified by their association with corresponding user accounts that were identified by communications 554 and operations 552 and/or 556.

The users of the second client device 520 and the third client device 530 can likewise use the group chat conversation to transmit messages to the other participants of the group chat conversation. For example, in operation 566, the second client device 520 can transmit a chat message 567 and in operation 568, the third client device can transmit a chat message 569, which can both be received by the server system 550 in operation 570.

In operation 572, the server system 550 then transmits the chat messages 573, 575 and 577 to the other participants of the group chat conversation. The received chat messages are presented on the respective devices in operations 574, 576 and 578.

Any number of client devices that are part of a group chat conversation may send and receive chat messages, such that operations such as those described in FIG. 5 may be occurring simultaneously for chat messages sent by multiple devices and received by the other devices. For example, the second client device 520 may send a chat message as part of a group chat conversation, and a chat message as an individual chat message. Likewise, the third client device 530 may send a message to all participants of the group chat conversation.

FIG. 6 is a flowchart showing an example method 600 of creating a group chat conversation, according to certain example embodiments. The method 600 may be embodied in computer readable instructions for execution by one or more processors such that the operations of the method 600 may be performed in part or in whole by the chat conversation system 302; accordingly, the method 600 is described below by way of example with reference thereto. However, it shall be appreciated that at least some of the operations of the method 600 may be deployed on various other hardware configurations and the method 600 is not intended to be limited to the chat conversation system 302.

At operation 602, a chat creation module 402 determines that a user has added at least two recipients to receive a message. For example, a user can use listing of contacts to select two or more individual users to add to a chat conversation.

At operation 604, the chat creation module 402 causes a display of a group chat creation button. For example, the group chat creation button can be presented on the group creation interface. The group chat creation button allows a user of the client device 110 to create a group chat conversation that includes the selected recipients and send messages as chat messages in the group chat conversation to the selected recipients. The chat creation module 402 also presents an individual send button that allows the user to transmit the message to each selected recipient individually, rather than as a group chat conversation.

At operation 606, the chat creation module 402 receives a user input indicating that the user has selected the group chat creation button. For example, the user can select the group chat creation button using a touch screen of the client device 110 to tap the presented group chat creation button.

At operation 608, the chat creation module 402 generates a group chat conversation that includes the selected recipients as members. For example, the chat creation module 402 can cause the client device 110 to communicate with the messaging server system 150 to create the group chat conversation.

At operation 610, the message response module 410 transmits the message as a group chat message in the group chat conversation. As a result, the message is transmitted to each of the other members of the group chat conversation.

FIG. 7 is a flowchart showing an example method 700 of automatically rearranging a stacked set of conversation cells, according to certain example embodiments. The method 700 may be embodied in computer readable instructions for execution by one or more processors such that the operations of the method 700 may be performed in part or in whole by the chat conversation system 302; accordingly, the method 700 is described below by way of example with reference thereto. However, it shall be appreciated that at least some of the operations of the method 700 may be deployed on various other hardware configurations and the method 700 is not intended to be limited to the chat conversation system 302.

At operation 702, the stacked conversation cell module 408 presents a stacked set of conversation cells on a display of the client device 110. The stacked set of conversation cells are stacked such that a first conversation cell from the set of conversation cells is a top conversation cell of the stacked set of conversation cells. The first conversation cell corresponds to a first chat conversation At operation 704, the message receiving module 404 receives a first chat communication that is a part of a second chat conversation. The second chat conversation is different than the first chat conversation. The second chat conversation is received while the stacked set of conversation cells is being presented by the client device 110.

At operation 706, the stacked conversation cell module 408 modifies presentation of the stacked set of conversation cells such that a second conversation cell corresponding to the second chat conversation is presented as the top conversation cell of the stacked set of conversation cells. The modifying is performed in response to receiving the first chat communication. Accordingly, the user is presented with the conversation cell corresponding the received message.

Modifying presentation of the stacked set of conversation cells comprises determining that the second conversation cell is included in the stacked set of conversation cells, and rearranging the stacked set of conversation cells such that the second conversation cell is presented above the first conversation cell. In this type of embodiments, the stacked set already included the second conversation cell so the stacked set of conversation cells is only reordered rather than a new conversation cell being added.

Modifying presentation of the stacked set of conversation cells further comprises determining that the second conversation cell is not included in the stacked set of conversation cells. In this type of scenario, the second conversation cell is generated and then added above the first conversation cell in the stacked set of conversation cells The stacked set of conversation cells can be associated with a threshold number of allowable conversation cells. Accordingly, modifying presentation of the stacked set of conversation cells further comprises determining whether a number of conversation cells in the stacked set of conversation cells meets the threshold number of allowable conversation cells. If so, the stacked conversation cell module 408 determines that a conversation cell from the stacked set of conversation cells has remained inactive for a longer period time than at least one other conversation cell in the stacked set of conversation cells. The stacked conversation cell module 408 then removes the inactive conversation cell from the stacked set of conversation cells to make room for the new conversation cell.

After modifying presentation of the stacked set of conversation cells, the interface module 406 receives a user input indicating that a user of the client device 110 would like to access the first conversation cell. For example, the user input can be caused by the user performing a swipe gesture on the display of the client device 110 over the second conversation cell. In response, the stacked conversation cell module 408 modifies presentation of the stacked set of conversation cells such that the first conversation cell is again presented as the top conversation cell of the stacked set of conversation cells. The second conversation cell can be removed from the stack or, alternatively, reordered within the stack.

Figure 8:
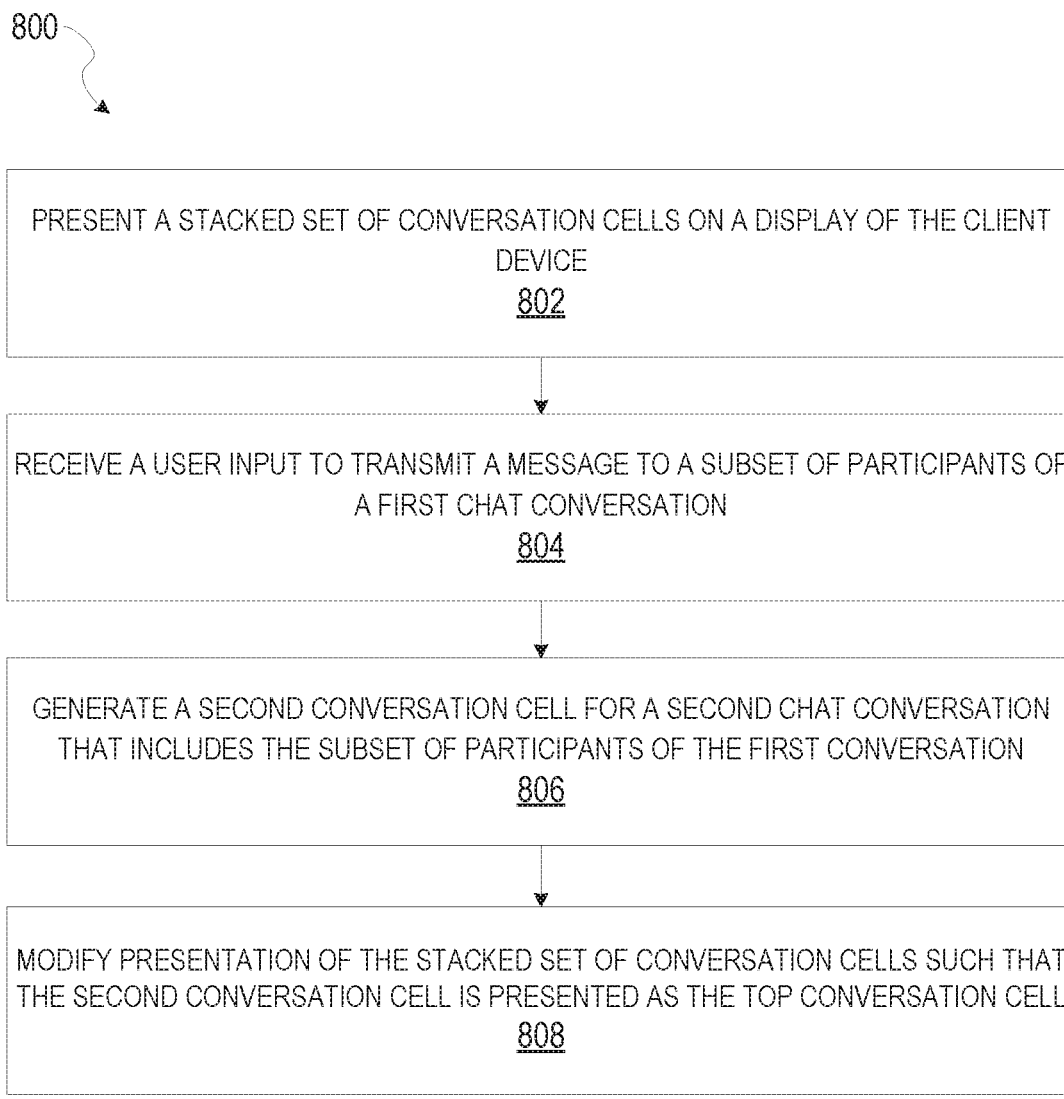
FIG. 8 is a flowchart showing another example method of automatically rearranging a stacked set of conversation cells, according to certain example embodiments.

FIG. 8 is a flowchart showing another example method 800 of automatically rearranging a stacked set of conversation cells, according to certain example embodiments. The method 800 may be embodied in computer readable instructions for execution by one or more processors such that the operations of the method 800 may be performed in part or in whole by the chat conversation system 302; accordingly, the method 800 is described below by way of example with reference thereto. However, it shall be appreciated that at least some of the operations of the method 800 may be deployed on various other hardware configurations and the method 800 is not intended to be limited to the chat conversation system 302.

At operation 802, the stacked conversation cell module 408 presents a stacked set of conversation cells on a display of the client device 110 such that a first conversation cell from the set of conversation cells is a top conversation cell of the stacked set of conversation cells. The first conversation cell corresponds to a first chat conversation that includes at least three participants. Accordingly, the first chat conversation is a group chat conversation.

At operation 804, the interface module 406 receives a user input indicating that a user of the client device 110 would like to transmit a message to a subset of participants of the first conversation. Accordingly, the user would like to send an individual chat message that will be received by only the selected subset of participants, rather than by all the participants.

At operation 806, the interface module 406 generates a second conversation cell for a second chat conversation that includes the subset of participants of the first conversation.

At operation 808, the stacked conversation cell module 408 modifies presentation of the stacked set of conversation cells such that the second conversation cell is presented as the top conversation cell of the stacked set of conversation cells. The user can then use the second conversation cell to send a chat message as part of the second chat conversation.

Figure 9A:
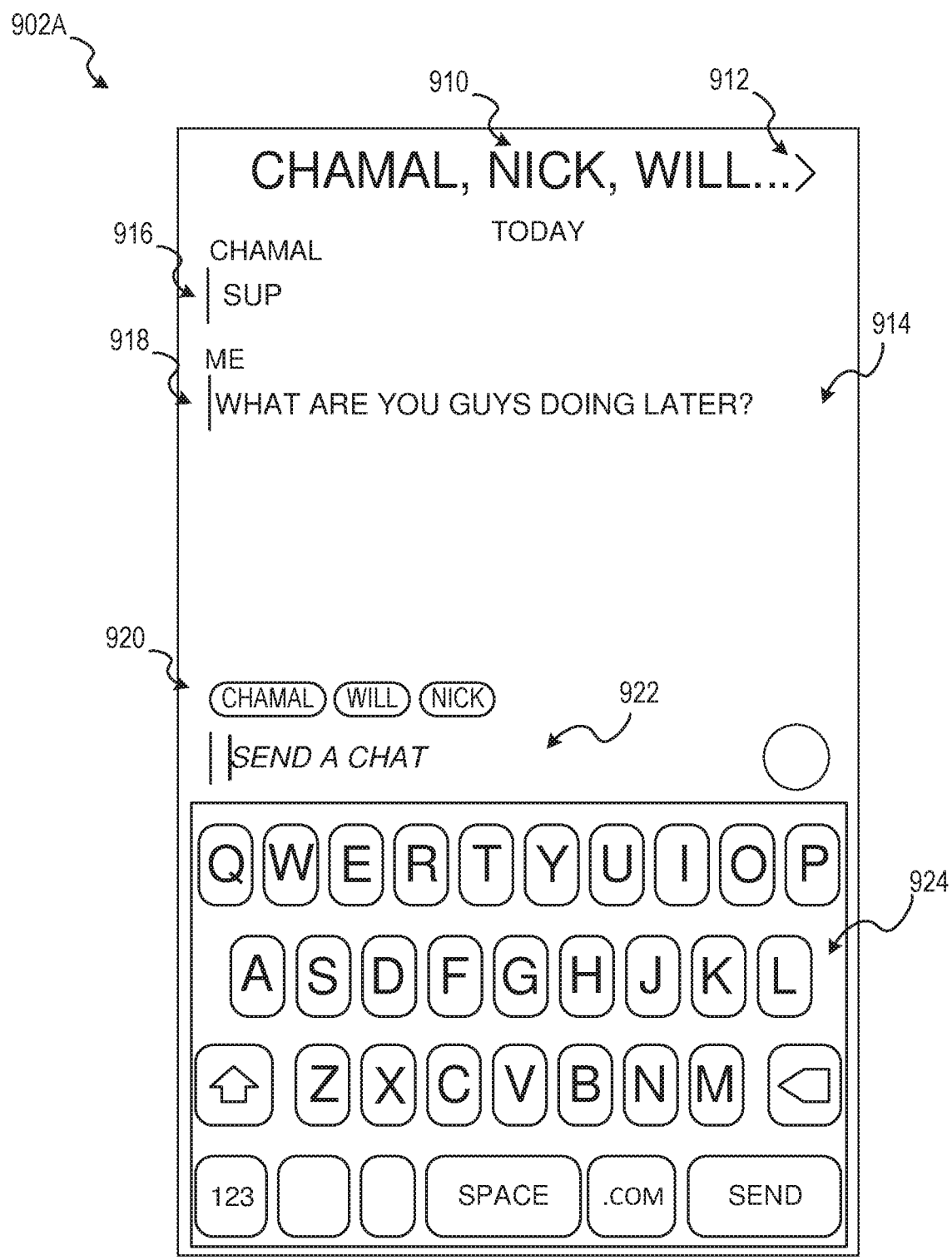
FIGS. 9A-9C illustrate aspects of chat conversations, in accordance with certain example embodiments.
Figure 9B:
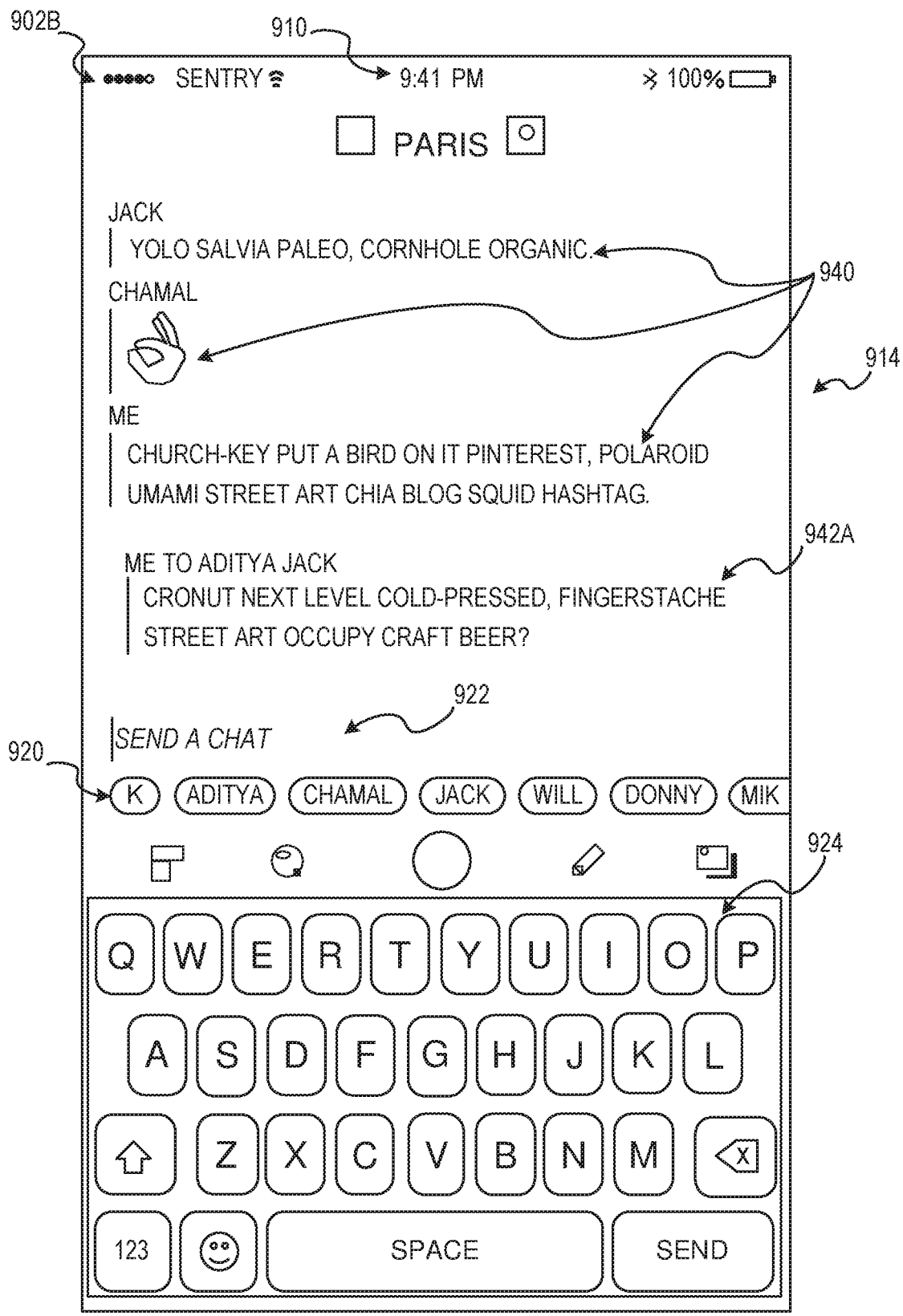
Figure 9C:
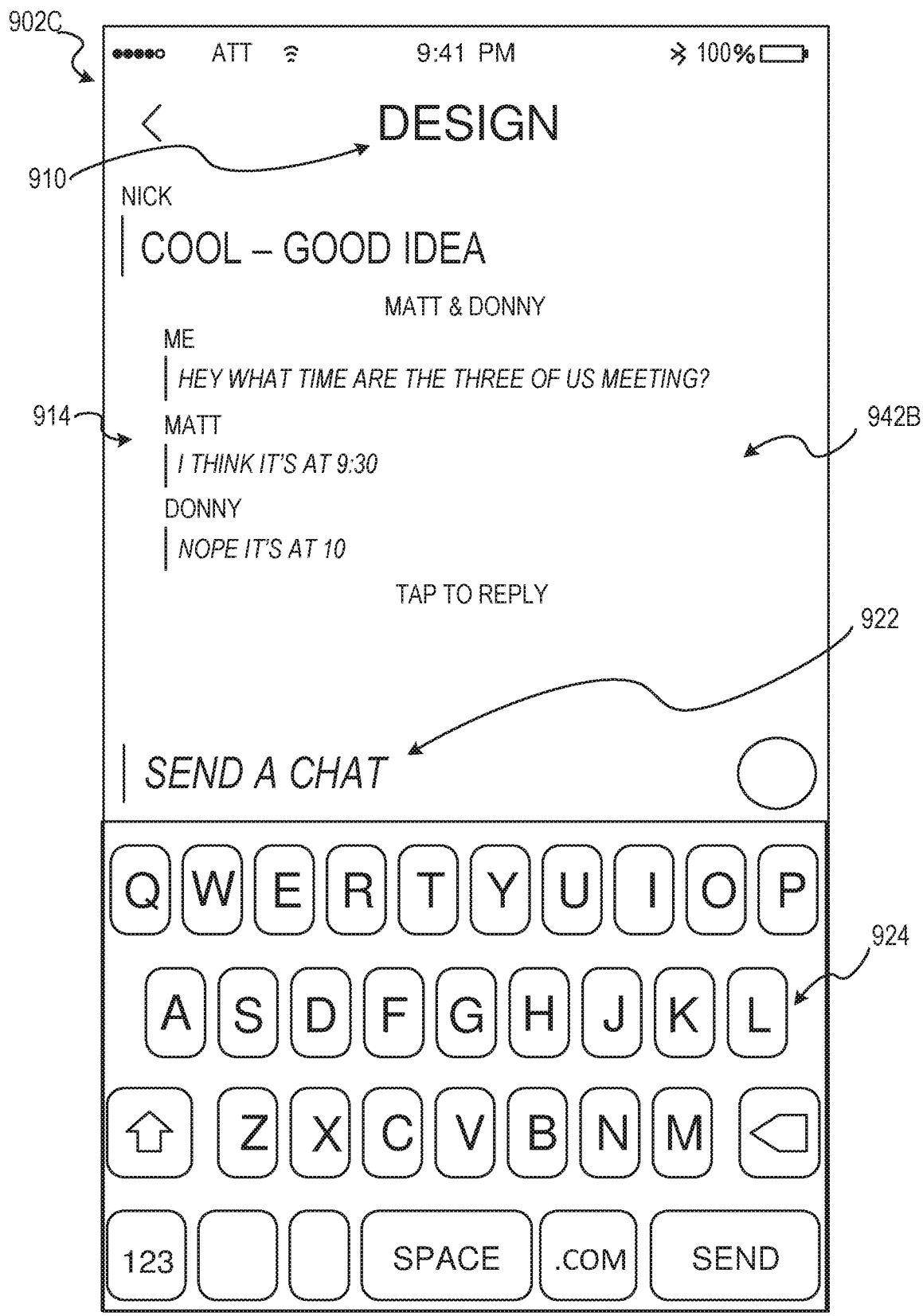

FIGS. 9A-9C illustrate aspects of chat conversations, in accordance with certain example embodiments. FIGS. 9A-9C illustrate aspects of a chat view 902 that may be used as part of a messaging client application such as messaging client application 202 operating on a client device 110. This includes client devices such as example client devices 110, 120, and 130 of FIG. 1, where a chat view 902 may be presented within display area. Chat view 902A of FIG. 9A includes a header 910 with a chat title next to a top right arrow 912. In some embodiments, interacting with a UI displayed by chat view 902 (e.g., by tapping the top right arrow 912 button of the interface) causes the UI to navigate back to the feed described briefly above. The example embodiment of FIG. 9A, with the title in the header 910, shows the first names or identifiers of the user accounts in the group chat. Names may be associated with user accounts by the user account controller, or by an individual user (e.g., by assigning names as aliases in a friend list.) In other embodiments, other details may be used in a header 910 of a group chat view 902. If there are too many names to be displayed within the header 910, the first few names are shown followed by an ellipsis. The ordering of the names may be dictated by the order of joining the group or in any other order allowed by the system. Tapping a touch target of the UI associated with the header 910 reveals a UI dropdown, which is discussed in greater detail below with respect to FIG. 10.

In chat view 902A, chat flow 914 includes two chat messages 916 and 918. Presence indicators 920 list group members, and may include indicators as to which group members are currently in a chat view 902 for the shared group chat on devices associated with user accounts corresponding to the presented names or user account names shown by presence indicators 920. In some embodiments, for example, colors associated with a user account may brighten or be displayed when a chat system has received a presence information from a user device associated with a user account within a certain time frame indicating that the user is displaying or interacting with chat view 902. When the chat system has not received a presence communication within a certain time frame, a name or account identifier of presence indicators 920 may indicate this as well (e.g., by greying out the associated name or account identifier).

Chat entry area 922 shows text or other content for a chat message before the message is sent. Data entry interface 924 is a portion of chat view 902 for entering information for a chat message, such as the software keyboard illustrated in FIG. 9A. In other embodiments, this may be a voice-to-text interface, or any other such interface for assisting with input for an ephemeral chat message.

In addition to the chat messages shown within chat flow 914, other status or presence messages may be displayed. Status or presence messages include receipt messages, presence notifications, or any other such information. For example, a chat interface may also have notifications. These chat notifications as part of the embodiment within chat flow 914 may include:

Typing-[display name] is typing in [group name] . . .
Push-"From [display name] in [group name]"
In App-"<chat icon>[group name]"
secondary text: "[display name]".

Content communications (e.g., image and video communications) are also presented in chat flow 914, and have associated notifications as part of a display interface for these content communications. Examples of such notifications include:

Push-"From [display name] in [group name]"
In App-"<icon>[group name]"-secondary text: "[display name]".

In addition to these notifications for text or content communications, other notifications may be used by a system. For example, certain notifications may be provided for users joining or leaving a group. Additionally, a user can block communications from another specific user or group of users. Notifications may be provided when a user is initially blocked, and notifications may be provided when communications are not received because a user has previously blocked a user sending a current message. Specific details of such notifications may vary between different implementations and may be selectable and customizable by different users.

In addition to allowing group chat within a UI of chat view 902, chat may be enabled between only a portion of members of a group within the same chat flow, as illustrated in FIGS. 9B and 9C. Thus, certain embodiments include systems and methods for a user taking part in a group chat conversation to have a private chat conversation with one or more of the members of the group without the knowledge of the rest of the group. Such private messages appear independently of the group conversation of chat flow 914. For example, the private messages can appear in a separate conversation cell than a conversation cell in which the group chat messages appear.

A user can also "scroll" within the private conversation and the group conversation independently within chat flow 914, even if they are both on the main or only display. For example, if a private chat flow within chat flow 914 exceeds a certain size, a number of messages, or a number of lines, a scrollable interface within chat flow 914 is presented. If the overall chat flow 914 is similarly larger than a threshold size that fits within chat flow 914, then a user may scroll messages within chat flow 914, and may also scroll within a sub-area that presents only a portion of the private group chat messages represented by private group chat 942A.

In the embodiment illustrated in FIG. 9B, the chat messages 940 shown as beginning at the left margins are messages shared with all of the members of the group. During group chat, a user can select one or more members of the group for a private group chat 942A message, and that private message will be sent only to those selected group members. The private group chat 942A message is displayed as part of the group message flow in chat view 902, but visually distinguished (e.g., with an indent) to show that the private group chat 942A message is not shared with the entire group. Such a private group chat 942A message may be initiated by, for example, touching the names of recipients in the display to add them to a sub-group. In some embodiments, if messages between the sub-group exceed a certain length, then another sub-flow may be embedded within chat flow 914 for the messages between members of the sub-group. The example of FIG. 9B shows a message from a user "JACK" to the whole group, followed by a message from user "CHAMAL" to the whole group, followed by a message from a user associated with the displayed interface, labeled as "ME," and sent to the whole group, followed by a private message from the device user "ME" to group members "ADITYA" and "JACK." As illustrated, the final message, which is a private message, is illustrated as indented in the group message flow, while the group messages above are shown at the left margin.

Additionally, as detailed herein, group messaging may use color assignments for each user in a group. In certain embodiments, colors may only be displayed for a portion of the users. In FIG. 9B, group members "WILL" and "DONNY" have their names listed as group members, but may not be shown with an associated color. This may be implemented so that only users that have participated in a group by sending a message have their colors displayed. This may also be implemented such that only user names that are currently part of the interface have a color displayed. This may also be implemented such that all invited group members have their names displayed, but only group members that have responded to an invitation to join a group have a color associated and displayed as part of the group interface. In other embodiments, other color association and user interface displays may be used.

FIG. 9C illustrates another example of a message flow for private group chat 942B messages within the group chat flow 914 area. Just as described above with respect to FIG. 9B, the private group chat 942B messages are shown indented from the leftmost margin where group message are shown. In the example of FIG. 9C, the private group chat 942B messages are not only indented, but a title or message header is also shown with information about recipients of the private message.

An interface area below the most recent message allows a single tap input to begin a message to the established sub-group from a previous message. Below this, a "send a chat" user interface area allows a single touch to begin entering a message to the entire group. The message chat flow 914 may be structured to show all messages ordered by time, but with private messages and group messages interwoven in the same flow. A swipe input up and down on the sub-group message display area may allow a user to scroll up or down to different private messages to initiate a private whisper reply.

Additionally, in certain embodiments, an independent scroll area for the private communications may be included. For example, in the embodiment of FIG. 9C, if a user swipes up or down in the area below the "MATT & DONNY" header and above the "TAP TO REPLY" area, the message display for the private message history will scroll up and down if there are more messages than fit in the whisper display area, while the group messages are stationary. In other embodiments, where a group message is presented below the private message area, the user interface swipe area may be in the area where text for the private messages is presented. If multiple different private messages are part of the same user interface display, these may each have separate display areas (e.g., conversation cells). For such an embodiment, each separate area will scroll to a history of their separate independent messages if a swipe input is received at the user interface.

Thus, as described above, a user can have a combination of two or more group chats or private conversations open on the same screen. Embodiments with such a single screen may have multiple layers of privacy (e.g., a group chat with six people, a private conversation with four of the six, and another private conversation between two of those four).

Figure 10:
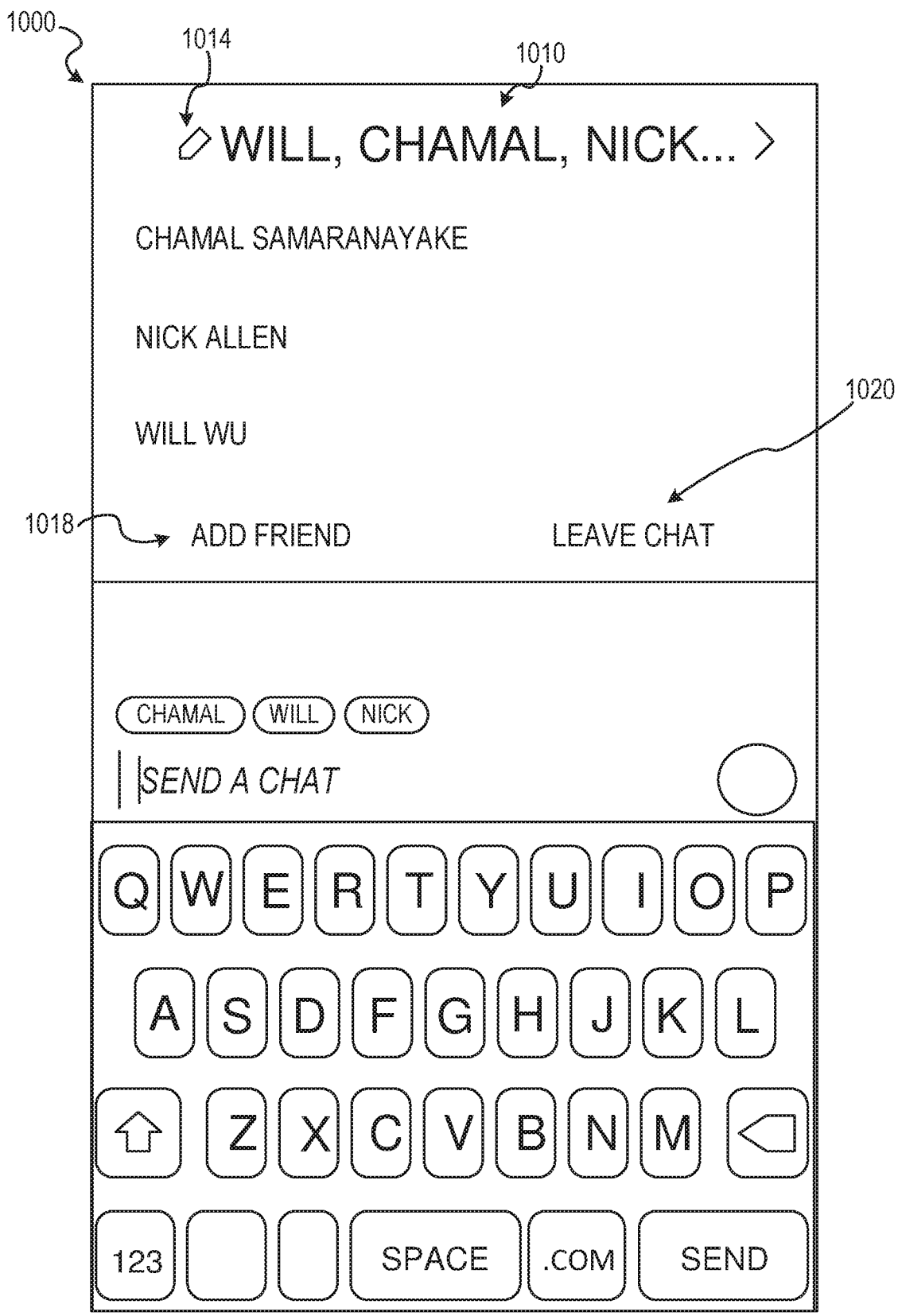
FIG. 10 illustrates aspects of chat conversations and an associated user interface, in accordance with certain example embodiments, and shows an example of a user interface.

FIG. 10 illustrates aspects of chat conversations and an associated UI, in accordance with certain example embodiments, and shows an example of a UI 1000. Entering a renaming state reveals an edit icon 1014 to the left of the header 1010. Tapping this icon 1014 allows the user to set the group name that is applied to all users. If a user changes the group name displayed in header 1010, it is added to the group chat UI and text similar in style to the date text is dropped into the chat:

"[display name] named the group [new group name]"
"You named the group [new group name]"

In some embodiments, renaming the group allows for a group name of 16 characters. Within the dropdown is a list of users' names (e.g., user account identifiers) in the group chat. In some embodiments, each user name is a different group chat color. Tapping the name of a user navigates into a chat with that user. If the user has associated symbols (e.g., emoji, friendmojis, symbol, etc.), they are displayed at the right-hand portion of the corresponding cell. At the bottom of the dropdown are options to add a user to the group and to leave the group.

For adding a user to the group, various actions may be used in different implementations. Selecting an add user area of a UI takes a user to a list of friends that are not in the group chat. This list may be received as a communication and response between a client device and a server system (e.g., a friend list is transmitted from the server to the client device). Alternatively, a friend list is stored in a client device. When the friend list is displayed, a user can tap multiple names from the friend list to add them to the group. In some embodiments, a maximum group size may be implemented.

A user may also use a UI to leave a group. When leaving a group, a user's saved items are unsaved (and deleted). Unviewed snaps and chats that a user has received are marked as read. Unviewed snaps that a user has sent remain in the chat until they are viewed by each member of the group, and then the chat messages disappear from each user's client device. In other words, unviewed chats that a user has sent remain in the chat until they are viewed such that clearing logic applies for other users after a group member has left the group.

A message is initially entered at a client device and is sent to devices associated with each user account that is part of a group chat conversation after a user enters a command to send the message. A server system then sends the messages to the appropriate client devices.

Figure 11:
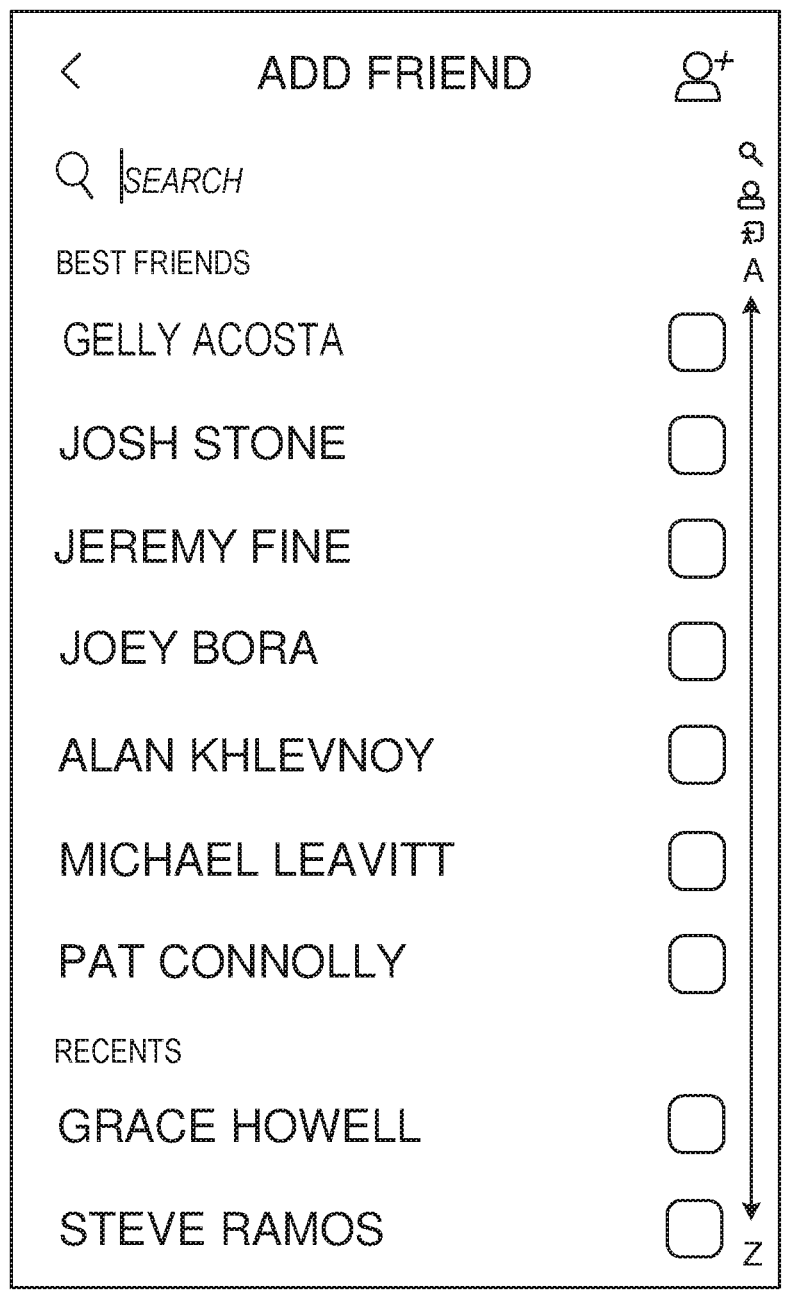
FIG. 11 illustrates aspects of chat conversations, in accordance with certain example embodiments.

FIG. 11 illustrates aspects of chat conversations, in accordance with certain example embodiments. FIG. 11 illustrates an example UI, shown as display 1100, for adding a friend to a chat group. If a user selects the add friend interface 1018 in the dropdown illustrated in FIG. 10, the user is presented with a list of friends which has previously been established for the user. The user can tap on multiple names in the UI to add them to the group. This interaction is the same as the send to page for a single content message communication in various embodiments. After pressing "Done," the friends selected are added to the group. A user cannot add more friends to the group if the group is at its maximum size as defined by a system threshold.

In some embodiments, if a group reaches the maximum limit threshold while adding friends in the Add Friend page, the checkboxes disappear, and the names dim to 50% opacity. If a user unchecks one of the friends that have been selected, the checkboxes reappear.

FIGS. 12A-J illustrate aspects of chat conversations including an implementation of a send-to interface 1200, according to one example embodiment. Send-to interface 1200 includes multiple views, shown as views 1202-1212. Such a send-to interface 1200 may be used to send a message to any number of other user accounts within a communication system. When a user has selected multiple other user accounts as recipients for the message within send-to interface 1200, the user sees a create group interface 1202 appear that allows the user to create a group of the selected other users, and makes a chat flow 1204 available for the group. Views 1202, 1204, 1206, 1208, and 1210 illustrate views of send-to interface 1200 for selecting individuals for a group chat. View 1210 shows a view with two users selected, one via a selection box, and one by a search input. In some embodiments, when a user selects a create group interface 1292, the user is taken to chat flow 1294 and the group is automatically created as shown by view 1212. In some embodiments, when the user taps the create group interface 1292, the user is taken to a confirmation page with the names selected, such as the confirmation page of view 1218. On the confirmation page, the user can deselect names and name the group. The user can hit a confirmation button above the keyboard to commit the changes and generate the group if it does not exist. If there are existing group chat threads in which this same set of users exist, the user sees that group in the confirmation page directly above the selected group. If the user taps the preexisting group, the user is taken back to the send-to page with that group selected. In some embodiments, the new group is not created from this flow unless the user sends a content communication or text message to the new group.

Figure 12A:
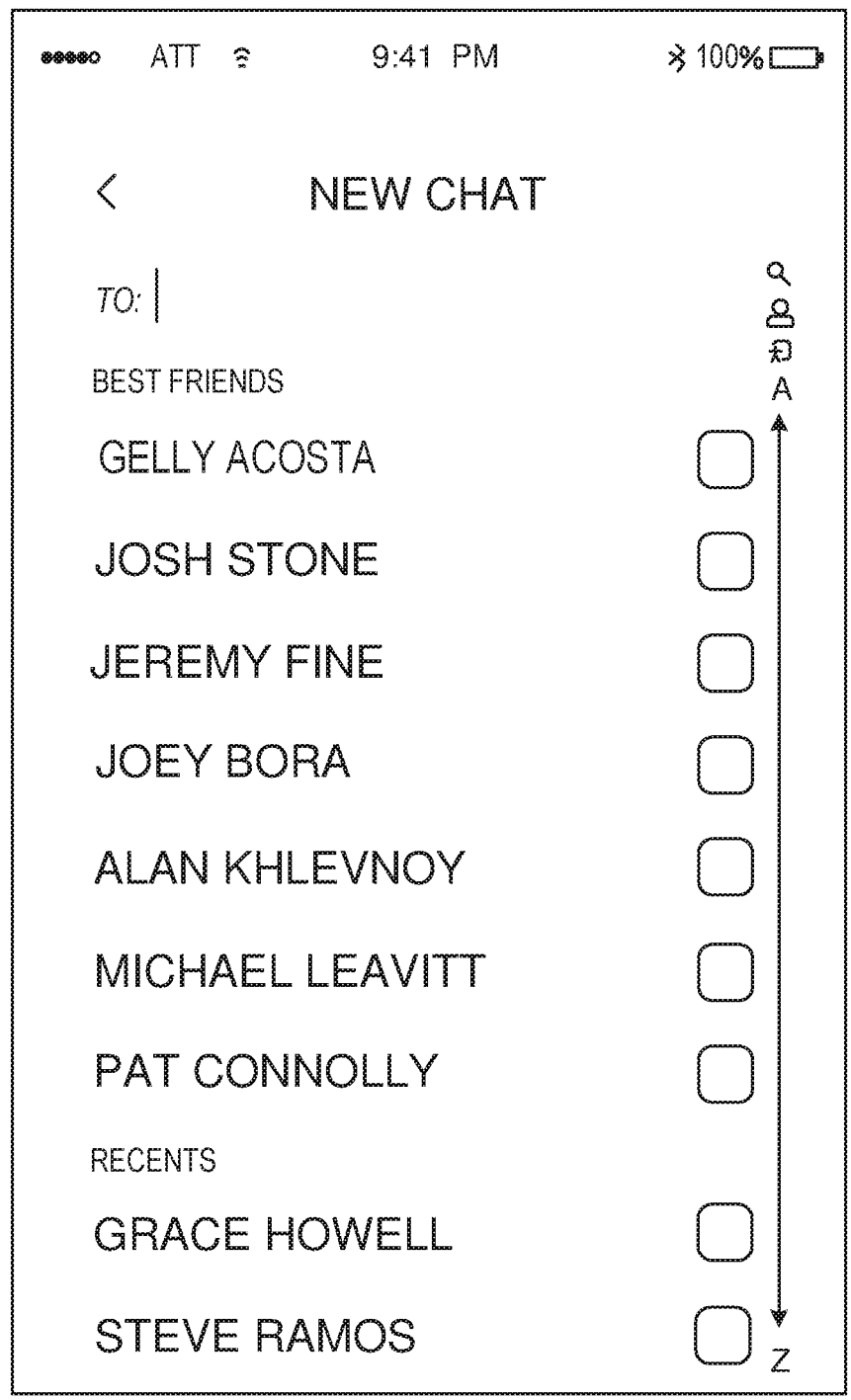
FIGS. 12A-12J illustrate aspects of chat conversations including an implementation of a send-to interface, according to one example embodiment.
Figure 12B:
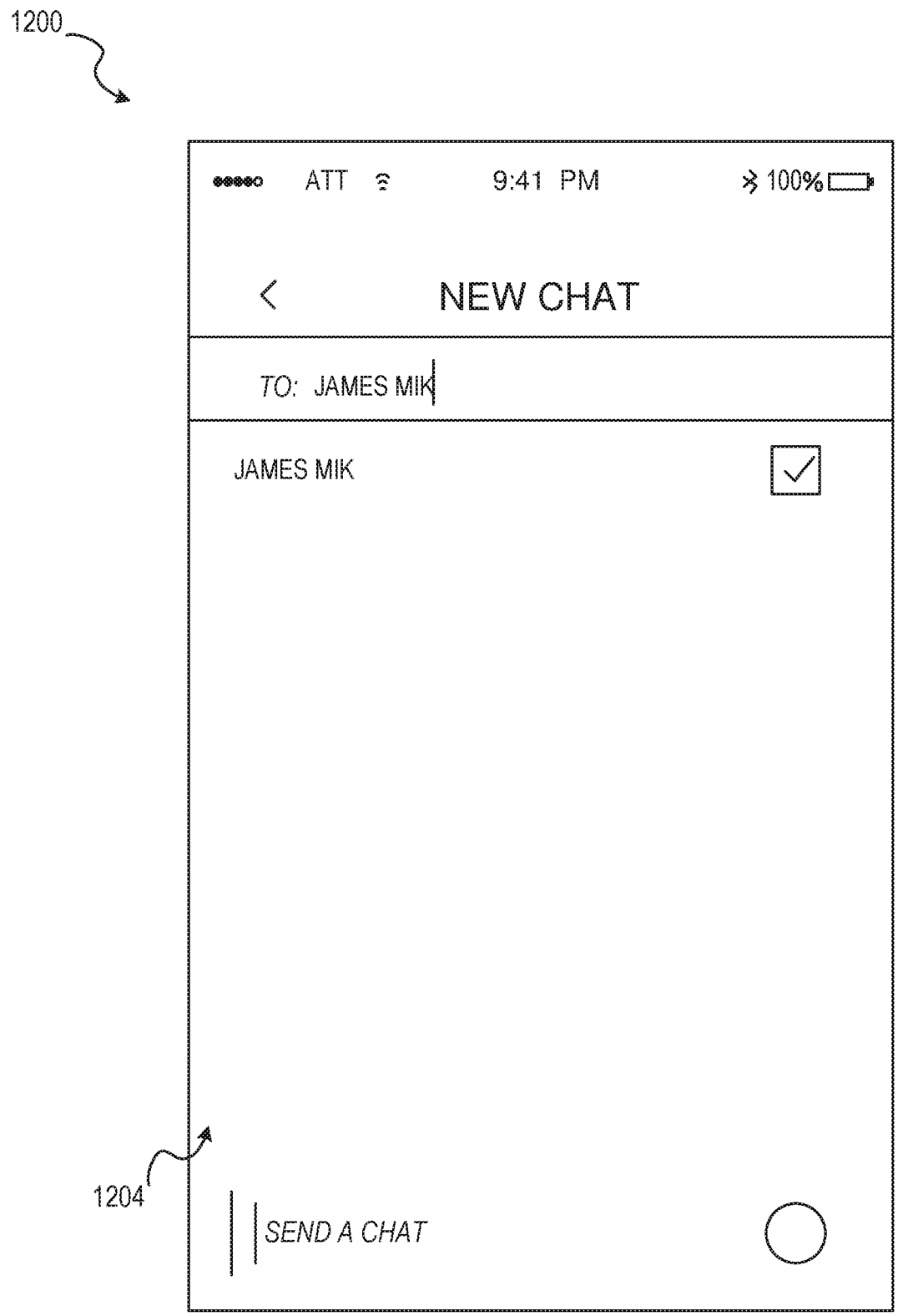
Figure 12C:
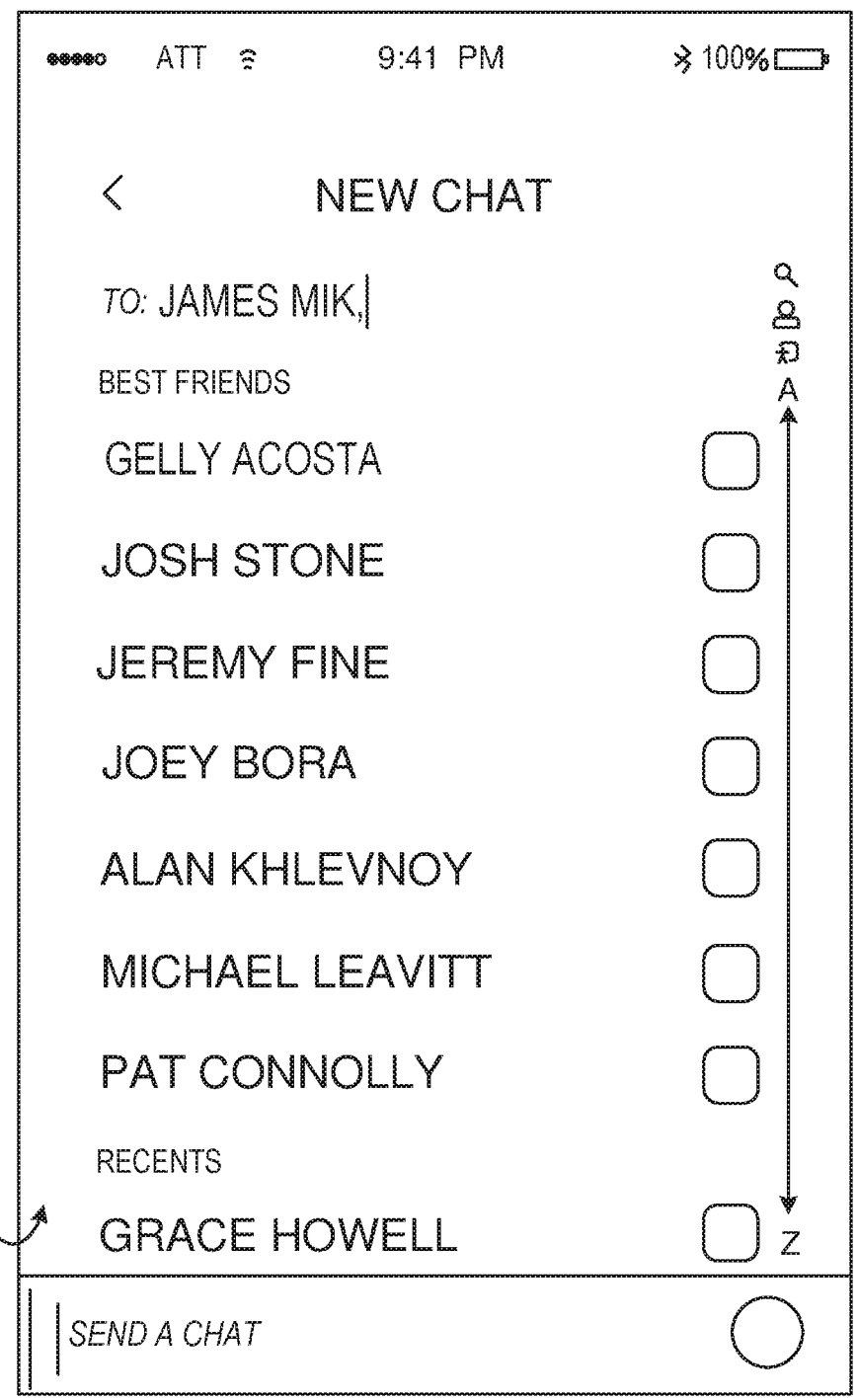
Figure 12D:
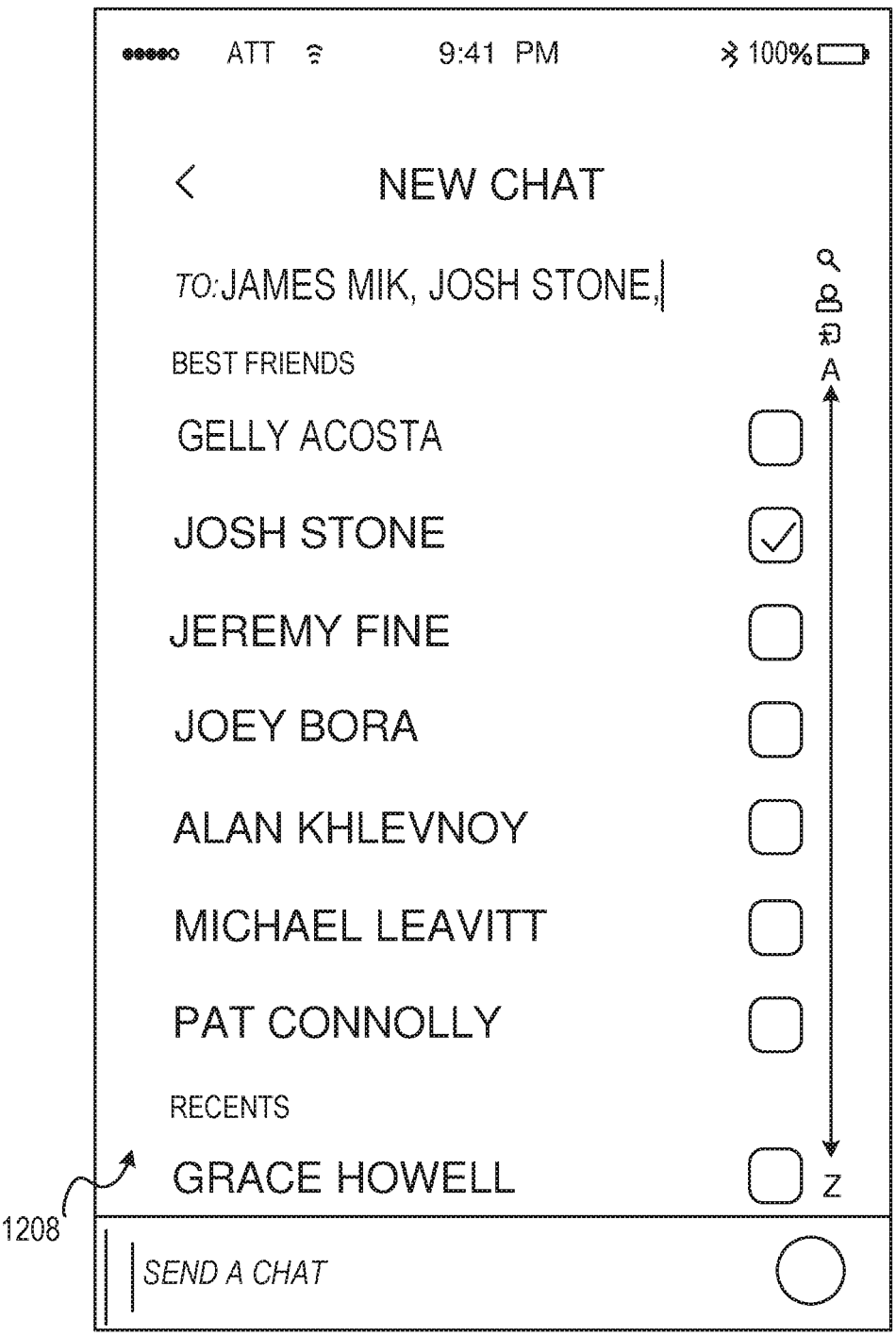
Figure 12E:
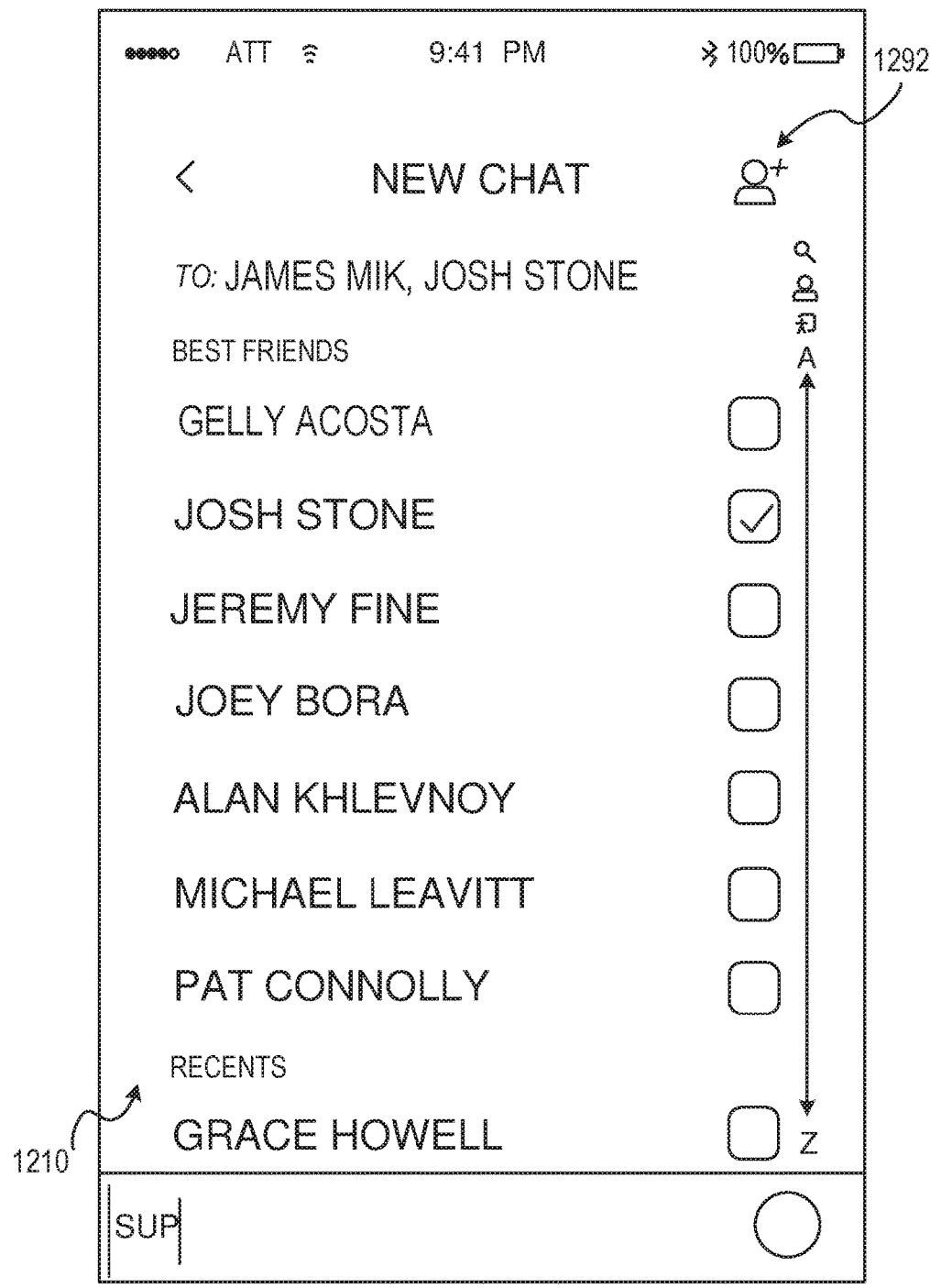
Figure 12F:
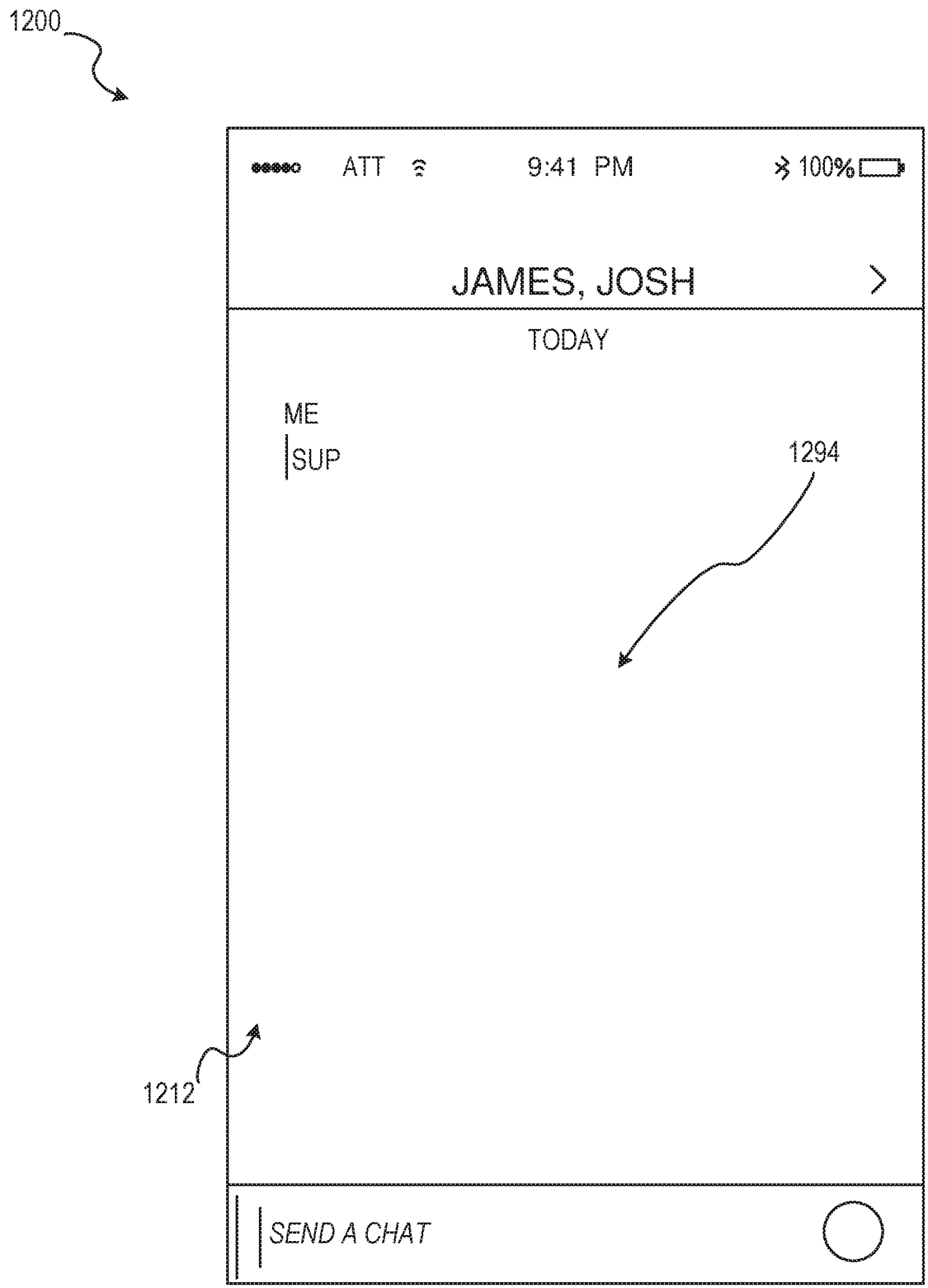
Figure 12G:
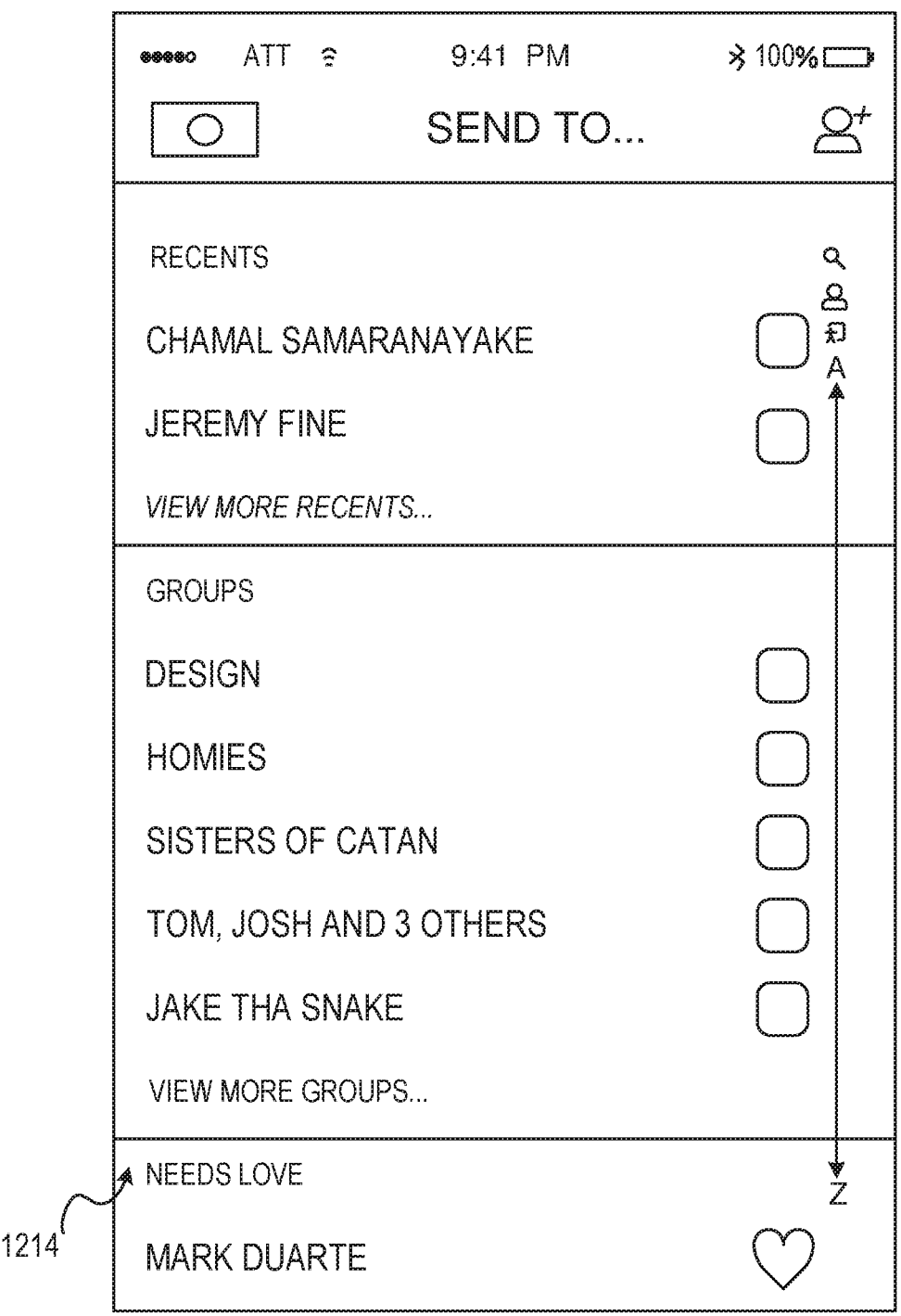
Figure 12H:
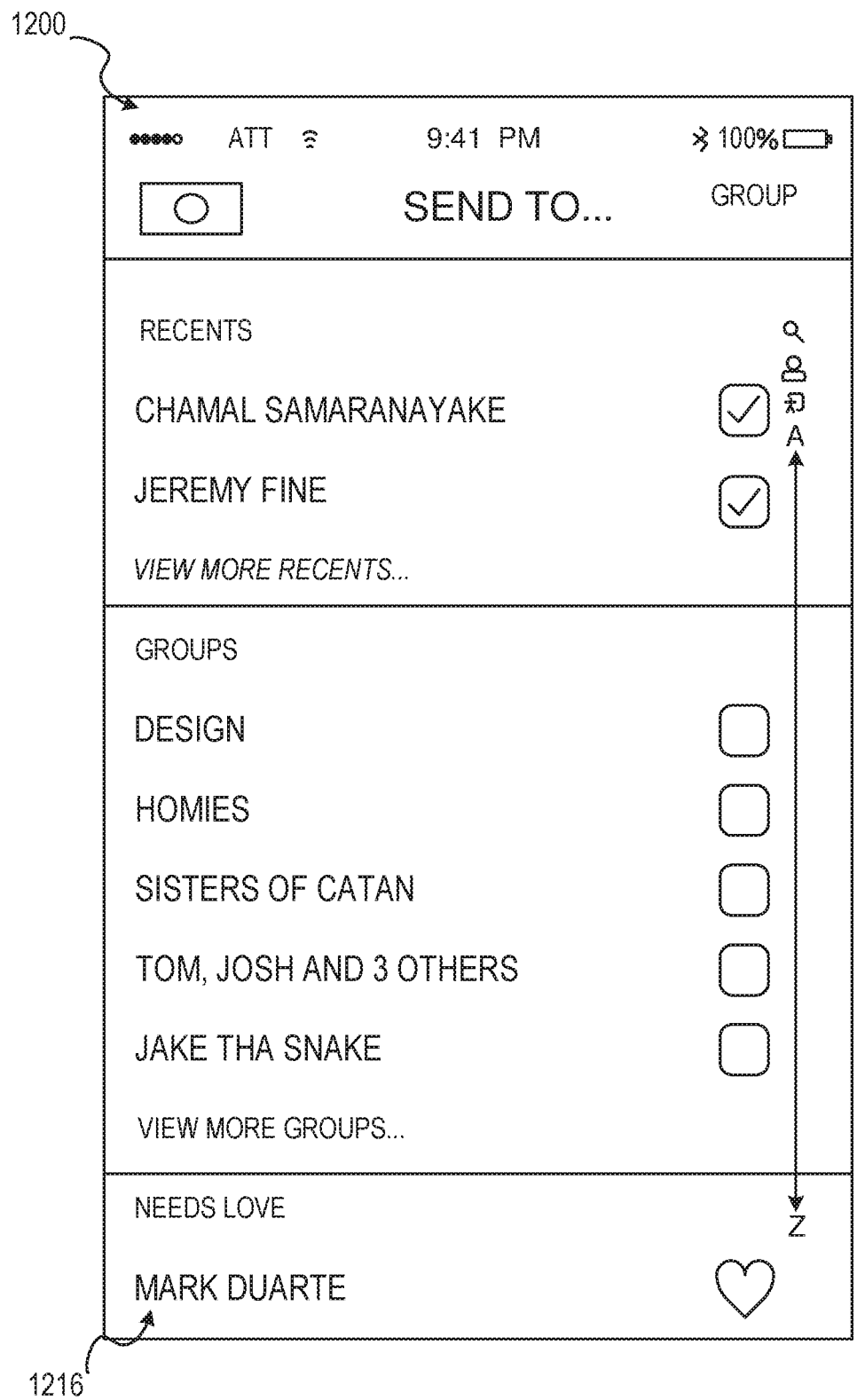
Figure 12I:
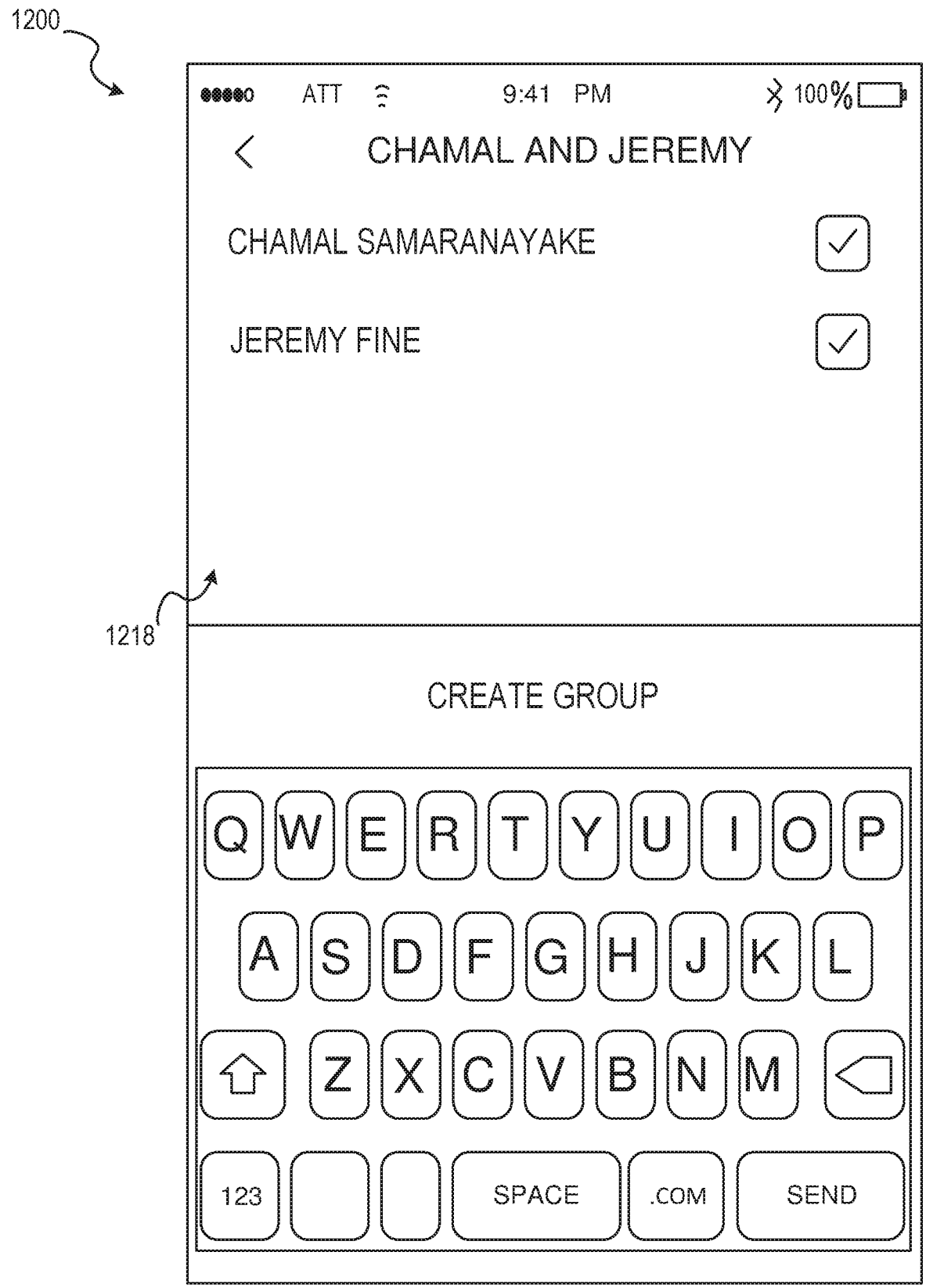
Figure 12J:
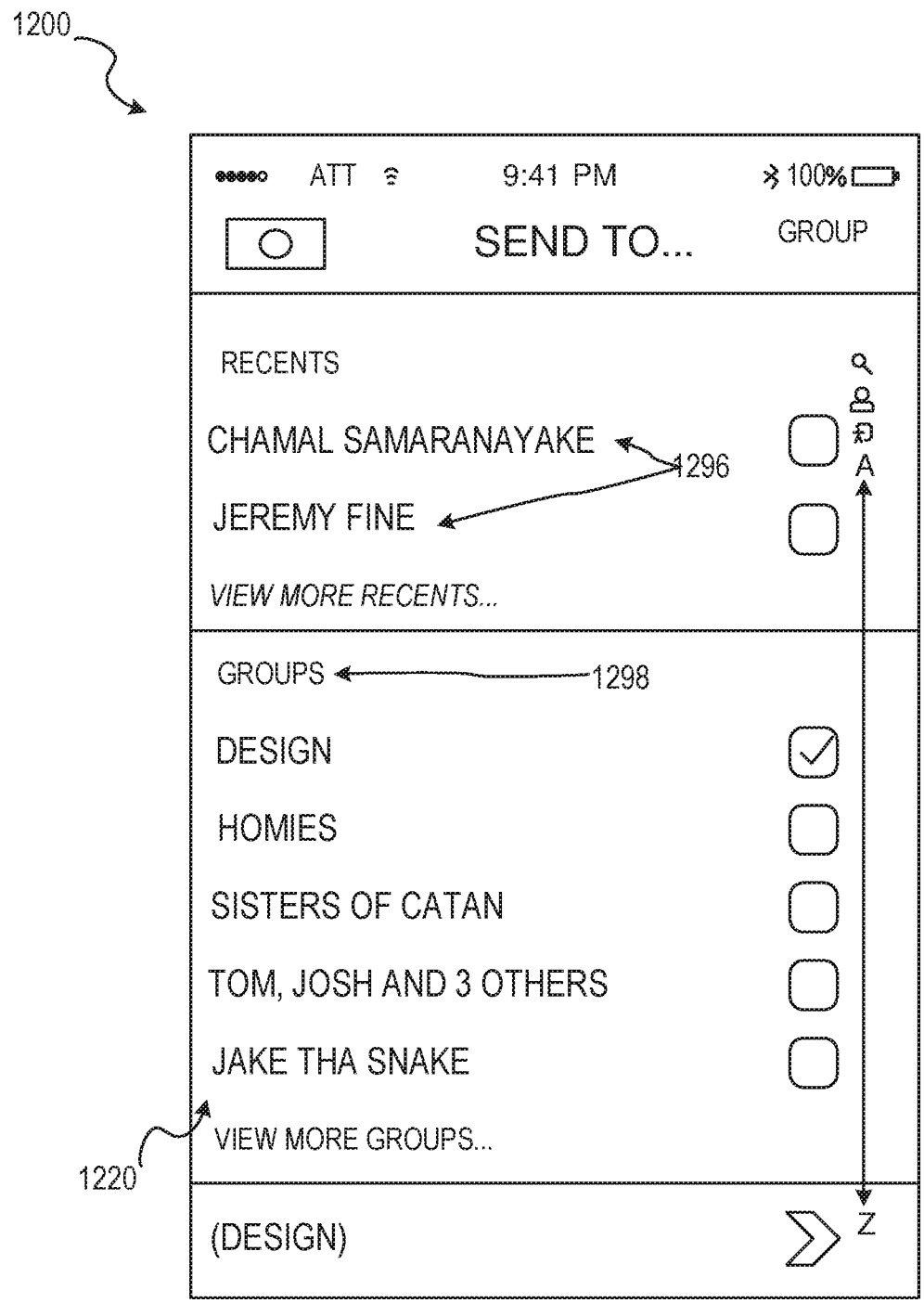

As illustrated in FIG. 12J, the user can select other groups and users from the send-to interface 1200 as well so that a single content communication may be sent to multiple groups. View 1220 of FIG. 12J shows a list of groups 1298 as well as user accounts 1296. As part of send-to interface 1200, a user may select multiple groups to which to send a message.

In some embodiments, if a user has created a group with users selected, the user is not prevented from selecting those users again to send the content communication to them individually or create another group with them. If a user has already created a group, accessing the send-to interface 1200 and selecting two or more users again will cause the create group interface button to show up again. Tapping the create group button will create a new group for the users selected. If a user attempts to create a new group with the same users that the user just used to create a new group, an additional group is not created, but the user is directed to the previously created group.

A user may additionally search for another user. If the user searches for names in the send-to page, groups containing those names will appear below the names of the matching users under a "Groups" header. Such embodiments may generate views with lists of individual users and groups, including any views such as views 1220, 1202-1210, and 1214-1216.

Software Architecture

Figure 13:
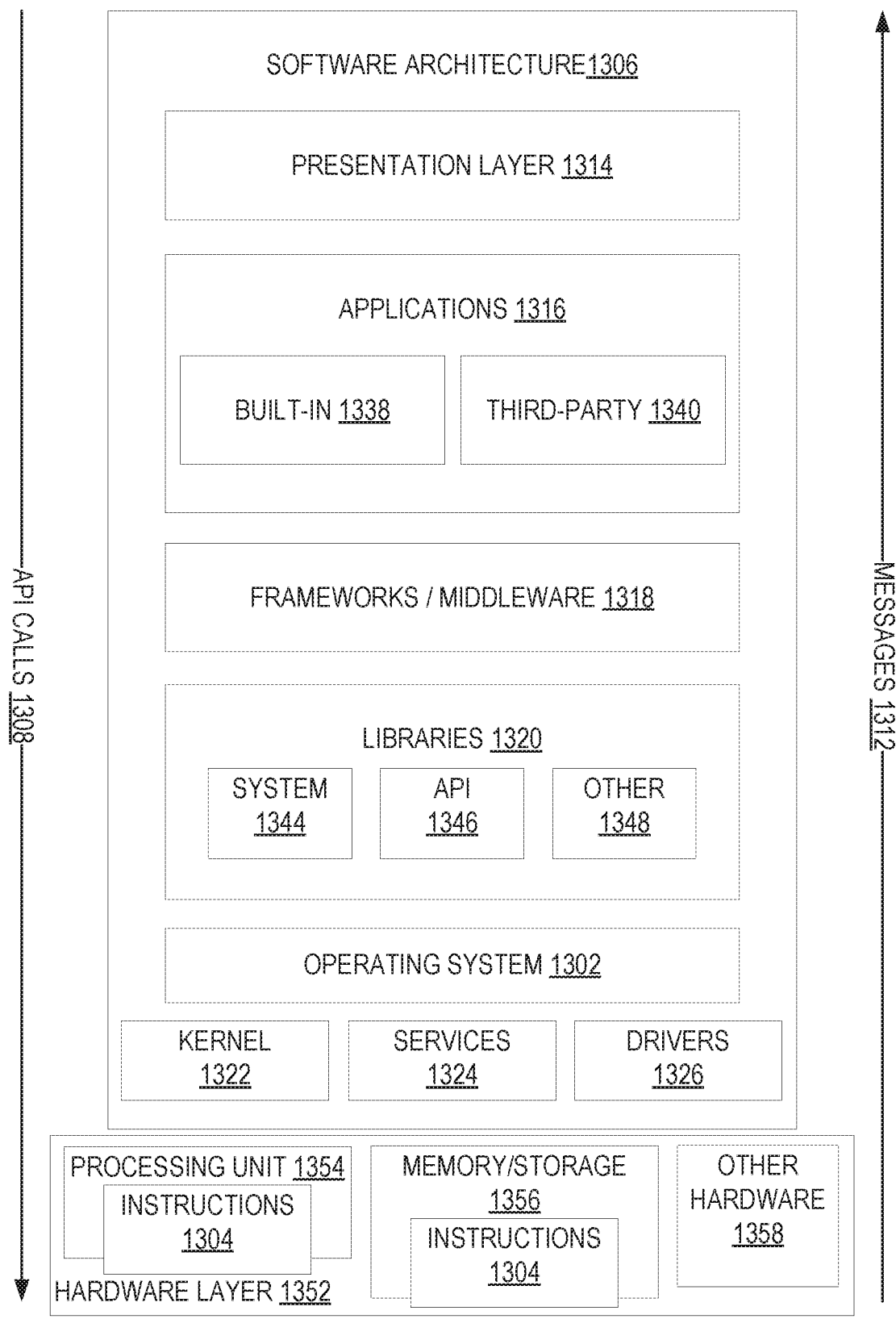
FIG. 13 is a block diagram illustrating an example software architecture, which may be used in conjunction with various hardware architectures herein described.

FIG. 13 is a block diagram illustrating an example software architecture 1306, which may be used in conjunction with various hardware architectures herein described. FIG. 13 is a non-limiting example of a software architecture and it will be appreciated that many other architectures may be implemented to facilitate the functionality described herein. The software architecture 1306 may execute on hardware such as machine 1400 of FIG. 14 that includes, among other things, processors 1404, memory 1414, and (input/output) I/O components 1418. A representative hardware layer 1352 is illustrated and can represent, for example, the machine 1400 of FIG. 14. The representative hardware layer 1352 includes a processing unit 1354 having associated executable instructions 1304. Executable instructions 1304 represent the executable instructions of the software architecture 1306, including implementation of the methods, components, and so forth described herein. The hardware layer 1352 also includes memory and/or storage modules memory/storage 1356, which also have executable instructions 1304. The hardware layer 1352 may also comprise other hardware 1358.

In the example architecture of FIG. 13, the software architecture 1306 may be conceptualized as a stack of layers where each layer provides particular functionality. For example, the software architecture 1306 may include layers such as an operating system 1302, libraries 1320, frameworks/middleware 1318, applications 1316, and a presentation layer 1314. Operationally, the applications 1316 and/or other components within the layers may invoke API calls 1308 through the software stack and receive a response 1312 in response to the API calls 1308. The layers illustrated are representative in nature and not all software architectures have all layers. For example, some mobile or special purpose operating systems may not provide a frameworks/middleware 1318, while others may provide such a layer. Other software architectures may include additional or different layers.

The operating system 1302 may manage hardware resources and provide common services. The operating system 1302 may include, for example, a kernel 1322, services 1324, and drivers 1326. The kernel 1322 may act as an abstraction layer between the hardware and the other software layers. For example, the kernel 1322 may be responsible for memory management, processor management (e.g., scheduling), component management, networking, security settings, and so on. The services 1324 may provide other common services for the other software layers. The drivers 1326 are responsible for controlling or interfacing with the underlying hardware. For instance, the drivers 1326 include display drivers, camera drivers, Bluetooth® drivers, flash memory drivers, serial communication drivers (e.g., Universal Serial Bus (USB) drivers). Wi-Fi® drivers, audio drivers, power management drivers, and so forth depending on the hardware configuration.

The libraries 1320 provide a common infrastructure that is used by the applications 1316 and/or other components and/or layers. The libraries 1320 provide functionality that allows other software components to perform tasks in an easier fashion than to interface directly with the underlying operating system 1302 functionality (e.g., kernel 1322, services 1324 and/or drivers 1326). The libraries 1320 may include system libraries 1344 (e.g., C standard library) that may provide functions such as memory allocation functions, string manipulation functions, mathematical functions, and the like. In addition, the libraries 1320 may include API libraries 1346 such as media libraries (e.g., libraries to support presentation and manipulation of various media format such as MPREG4, H.264. MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1320 may also include a wide variety of other libraries 1348 to provide many other APIs to the applications 1316 and other software components/modules.

The frameworks/middleware 1318 (also sometimes referred to as middleware) provide a higher-level common infrastructure that may be used by the applications 1316 and/or other software components/modules. For example, the frameworks/middleware 1318 may provide various graphic user interface (GUI) functions, high-level resource management, high-level location services, and so forth. The frameworks/middleware 1318 may provide a broad spectrum of other APIs that may be used by the applications 1316 and/or other software components/modules, some of which may be specific to a particular operating system 1302 or platform.

The applications 1316 include built-in applications 1338 and/or third-party applications 1340. Examples of representative built-in applications 1338 may include, but are not limited to, a contacts application, a browser application, a book reader application, a location application, a media application, a messaging application, and/or a game application. Third-party applications 1340 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1340 may invoke the API calls 1308 provided by the mobile operating system (such as operating system 1302) to facilitate functionality described herein.

The applications 1316 may use built in operating system functions (e.g., kernel 1322, services 1324 and/or drivers 1326), libraries 1320, and frameworks/middleware 1318 to create user interfaces to interact with users of the system. Alternatively, or additionally, in some systems interactions with a user may occur through a presentation layer, such as presentation layer 1314. In these systems, the application/component "logic" can be separated from the aspects of the application/component that interact with a user.

Figure 14:
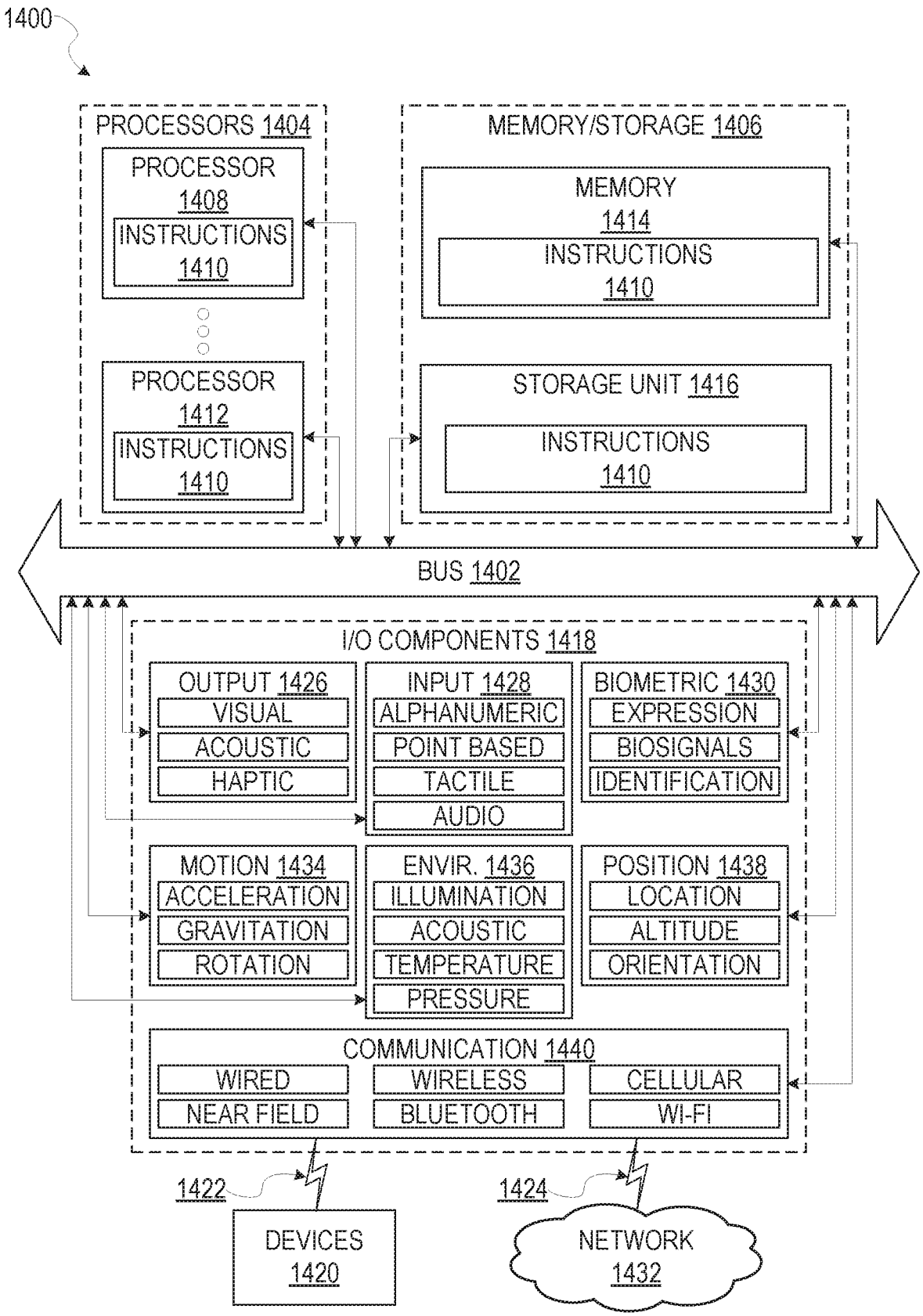
FIG. 14 is a block diagram illustrating components of a machine, according to some example embodiments, able to read instructions from a machine-readable medium (e.g., a machine-readable storage medium) and perform any one or more of the methodologies discussed herein.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically. FIG. 14 shows a diagrammatic representation of the machine 1400 in the example form of a computer system, within which instructions 1410 (e.g., software, a program, an application, an applet, an app, or other executable code) for causing the machine 1400 to perform any one or more of the methodologies discussed herein may be executed. As such, the instructions 1410 may be used to implement modules or components described herein. The instructions 1410 transform the general, non-programmed machine 1400 into a particular machine 1400 programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1410, sequentially or otherwise, that specify actions to be taken by machine 1400. Further, while only a single machine 1400 is illustrated, the term "machine" shall also be taken to include a collection of machines that individually or jointly execute the instructions 1410 to perform any one or more of the methodologies discussed herein.

The machine 1400 may include processors 1404, memory memory/storage 1406, and I/O components 1418, which may be configured to communicate with each other such as via a bus 1402. The memory/storage 1406 may include a memory 1414, such as a main memory, or other memory storage, and a storage unit 1416, both accessible to the processors 1404 such as via the bus 1402. The storage unit 1416 and memory 1414 store the instructions 1410 embodying any one or more of the methodologies or functions described herein. The instructions 1410 may also reside, completely or partially, within the memory 1414, within the storage unit 1416, within at least one of the processors 1404 (e.g., within the processor's cache memory), or any suitable combination thereof, during execution thereof by the machine 1400. Accordingly, the memory 1414, the storage unit 1416, and the memory of processors 1404 are examples of machine-readable media.

The I/O components 1418 may include a wide variety of components to receive input, provide output, produce output, transmit information, exchange information, capture measurements, and so on. The specific I/O components 1418 that are included in a particular machine 1400 will depend on the type of machine. For example, portable machines such as mobile phones will likely include a touch input device or other such input mechanisms, while a headless server machine will likely not include such a touch input device. It will be appreciated that the I/O components 1418 may include many other components that are not shown in FIG. 14. The I/O components 1418 are grouped according to functionality merely for simplifying the following discussion and the grouping is in no way limiting. In various example embodiments, the I/O components 1418 may include output components 1426 and input components 1428. The output components 1426 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1428 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1418 may include biometric components 1430, motion components 1434, environmental components 1436, or position components 1438 among a wide array of other components. For example, the biometric components 1430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1434 may include acceleration sensor components (e.g., accelerometer), gravitation sensor components, rotation sensor components (e.g., gyroscope), and so forth. The environment components 1436 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1438 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1418 may include communication components 1440 operable to couple the machine 1400 to a network 1432 or devices 1420 via coupling 1424 and coupling 1422, respectively. For example, the communication components 1440 may include a network interface component or other suitable device to interface with the network 1432. In further examples, communication components 1440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1420 may be another machine or any of a wide variety of peripheral devices (e.g., a peripheral device coupled via a USB).

Moreover, the communication components 1440 may detect identifiers or include components operable to detect identifiers. For example, the communication components 1440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1440, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smart phone, tablet, ultra book, netbook laptop, multi-processor system, microprocessor-based or programmable consumer electronics, game console, STB, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code." etc.) and which produces corresponding output signals that are applied to operate a machine. A processor may be, for example, a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

What is claimed is:

1. A method comprising:
    presenting, by a client device, a stacked set of conversation cells on a display of the client device, the stacked set of conversation cells stacked such that a first conversation cell from the stacked set of conversation cells is a top conversation cell of the stacked set of conversation cells, the first conversation cell corresponding to a first chat conversation;
    while presenting the stacked set of conversation cells, receiving, by the client device, a first chat communication that is a part of a second chat conversation, the second chat conversation being different than the first chat conversation;
    in response to the receiving of the first chat communication, modifying the presentation of the stacked set of conversation cells such that a second conversation cell corresponding to the second chat conversation is presented as the top conversation cell of the stacked set of conversation cells; and
    in response to receiving a user selection of the top conversation cell:
        displaying a list of group messages exchanged between a plurality of members of a group associated with the top conversation cell, the list of group messages being accessible by each of the plurality of members of the group;
        displaying, within the list of group messages, concurrently with the list of group messages, one or more private messages exchanged only between a subset of the plurality of members, the one or more private messages being accessible only by the subset of the plurality of members; and
        displaying the list of group of messages independently of the one or more private messages scrolling in response to a user request.

2. The method of claim 1, further comprising:
    after modifying presentation of the stacked set of conversation cells, receiving a user selection of the second conversation cell and detecting user input that swipes away the selected second conversation cell; and
    in response to detecting the user input, removing the second conversation cell and modifying presentation of the stacked set of conversation cells such that the first conversation cell is again presented as the top conversation cell of the stacked set of conversation cells.

3. The method of claim 1, wherein only the top conversation cell is interactable by a user.

4. The method of claim 1, further comprising:
    displaying names of the plurality of members of the group associated with the top conversation cell in response to receiving the user selection of the top conversation cell, wherein the names of the plurality of members are ordered based on an order in which each respective member in the plurality of members joined the group;
    after modifying the presentation of the stacked set of conversation cells, transmitting a response chat message as part of the second chat conversation; and
    in response to the transmitting of the response chat message, modifying the presentation of the stacked set of conversation cells such that the first conversation cell is presented as the top conversation cell of the stacked set of conversation cells.

5. The method of claim 1, wherein the one or more private messages are interwoven in a message flow of the list of group messages and the one or more private messages are visually distinguishable from the list of group messages by indenting the one or more private messages relative to the list of group messages.

6. The method of claim 1, further comprising displaying a title that identifies the subset of the plurality of members adjacent to the one or more private messages.

7. The method of claim 6, wherein the list of group of messages is scrolled independently of the one or more private messages by receiving a user input that includes a gesture that swipes up or down a display screen within a region defined between a position of the title and a position of an option to send a private message, wherein the one or more private messages are displayed within the region, and wherein the modifying of the presentation of the stacked set of conversation cells further comprises:
   determining that a number of conversation cells in the stacked set of conversation cells meets a threshold number of allowable conversation cells;
   determining that a third conversation cell from the stacked set of conversation cells has remained inactive for a longer period time than at least one other conversation cell in the stacked set of conversation cells; and
   removing the third conversation cell from the stacked set of conversation cells.

8. A client device comprising:
one or more computer processors; and
one or more computer-readable mediums storing instructions that, when executed by the one or more computer processors, cause the client device to perform operations comprising:
   presenting a stacked set of conversation cells on a display of the client device, the stacked set of conversation cells stacked such that a first conversation cell from the stacked set of conversation cells is a top conversation cell of the stacked set of conversation cells, the first conversation cell corresponding to a first chat conversation;
   while presenting the stacked set of conversation cells, receiving a first chat communication that is a part of a second chat conversation, the second chat conversation being different than the first chat conversation;
   in response to the receiving of the first chat communication, modifying the presentation of the stacked set of conversation cells such that a second conversation cell corresponding to the second chat conversation is presented as the top conversation cell of the stacked set of conversation cells; and
   in response to receiving a user selection of the top conversation cell:
      displaying a list of group messages exchanged between a plurality of members of a group associated with the top conversation cell, the list of group messages being accessible by each of the plurality of members of the group;
      displaying, within the list of group messages, concurrently with the list of group messages, one or more private messages exchanged only between a subset of the plurality of members, the one or more private messages being accessible only by the subset of the plurality of members; and
      displaying the list of group of messages independently of the one or more private messages scrolling in response to a user request.

9. The client device of claim 8, the operations further comprising:
   after modifying presentation of the stacked set of conversation cells, receiving a user selection of the second conversation cell and detecting user input that swipes away the selected second conversation cell; and
   in response to detecting the user input, removing the second conversation cell and modifying presentation of the stacked set of conversation cells such that the first conversation cell is again presented as the top conversation cell of the stacked set of conversation cells.

10. The client device of claim 8, wherein only the top conversation cell is interactable by a user.

11. The client device of claim 8, the operations further comprising:
   displaying names of the plurality of members of the group associated with the top conversation cell in response to receiving the user selection of the top conversation cell, wherein the names of the plurality of members are ordered based on an order in which each respective member in the plurality of members joined the group;
   after modifying the presentation of the stacked set of conversation cells, transmitting a response chat message as part of the second chat conversation; and
   in response to the transmitting of the response chat message, modifying the presentation of the stacked set of conversation cells such that the first conversation cell is presented as the top conversation cell of the stacked set of conversation cells.

12. The client device of claim 8, wherein the one or more private messages are interwoven in a message flow of the list of group messages and the one or more private messages are visually distinguishable from the list of group messages by indenting the one or more private messages relative to the list of group messages.

13. The client device of claim 8, wherein the operations further comprise displaying a title that identifies the subset of the plurality of members adjacent to the one or more private messages.

14. The client device of claim 13, wherein the list of group of messages is scrolled independently of the one or more private messages by receiving a user input that includes a gesture that swipes up or down a display screen within a region defined between a position of the title and a position of an option to send a private message, wherein the one or more private messages are displayed within the region, and wherein the modifying of the presentation of the stacked set of conversation cells further comprises:
   determining that a number of conversation cells in the stacked set of conversation cells meets a threshold number of allowable conversation cells;
   determining that a third conversation cell from the stacked set of conversation cells has remained inactive for a longer period time than at least one other conversation cell in the stacked set of conversation cells; and
   removing the third conversation cell from the stacked set of conversation cells.

15. A non-transitory computer-readable medium storing instructions that, when executed by one or more computer processors of a client device, cause the client device to perform operations comprising:
   presenting a stacked set of conversation cells on a display of the client device, the stacked set of conversation cells stacked such that a first conversation cell from the stacked set of conversation cells is a top conversation cell of the stacked set of conversation cells, the first conversation cell corresponding to a first chat conversation;

while presenting the stacked set of conversation cells, receiving a first chat communication that is a part of a second chat conversation, the second chat conversation being different than the first chat conversation;

in response to the receiving of the first chat communication, modifying the presentation of the stacked set of conversation cells such that a second conversation cell corresponding to the second chat conversation is presented as the top conversation cell of the stacked set of conversation cells; and in response to receiving a user selection of the top conversation cell:
- displaying a list of group messages exchanged between a plurality of members of a group associated with the top conversation cell, the list of group messages being accessible by each of the plurality of members of the group;
- displaying, within the list of group messages, concurrently with the list of group messages, one or more private messages exchanged only between a subset of the plurality of members, the one or more private messages being accessible only by the subset of the plurality of members; and
- displaying the list of group of messages independently of the one or more private messages scrolling in response to a user request.

16. The non-transitory computer-readable medium of claim 15, the operations further comprising:
after modifying presentation of the stacked set of conversation cells, receiving a user selection of the second conversation cell and detecting user input that swipes away the selected second conversation cell; and
in response to detecting the user input, removing the second conversation cell and modifying presentation of the stacked set of conversation cells such that the first conversation cell is again presented as the top conversation cell of the stacked set of conversation cells.

17. The non-transitory computer-readable medium of claim 15, wherein only the top conversation cell is interactable by a user.

18. The non-transitory computer-readable medium of claim 15, the operations further comprising:

displaying names of the plurality of members of the group associated with the top conversation cell in response to receiving the user selection of the top conversation cell, wherein the names of the plurality of members are ordered based on an order in which each respective member in the plurality of members joined the group;
after modifying the presentation of the stacked set of conversation cells, transmitting a response chat message as part of the second chat conversation; and
in response to the transmitting of the response chat message, modifying the presentation of the stacked set of conversation cells such that the first conversation cell is presented as the top conversation cell of the stacked set of conversation cells.

19. The non-transitory computer-readable medium of claim 15, wherein the one or more private messages are interwoven in a message flow of the list of group messages and the one or more private messages are visually distinguishable from the list of group messages by indenting the one or more private messages relative to the list of group messages.

20. The non-transitory computer-readable medium of claim 15, wherein the list of group of messages is scrolled independently of the one or more private messages by receiving a user input that includes a gesture that swipes up or down a display screen within a region defined between a position of the title and a position of an option to send a private message, wherein the one or more private messages are displayed within the region, and wherein the modifying of the presentation of the stacked set of conversation cells comprises:
- determining that the second conversation cell is not included in the stacked set of conversation cells;
- generating the second conversation cell;
- adding the second conversation cell above the first conversation cell in the stacked set of conversation cells;
- determining that a number of conversation cells in the stacked set of conversation cells meets a threshold number of allowable conversation cells;
- determining that a third conversation cell from the stacked set of conversation cells has remained inactive for a longer period time than at least one other conversation cell in the stacked set of conversation cells; and
- removing the third conversation cell from the stacked set of conversation cells.

* * * * *